(12) United States Patent
Maeda

(10) Patent No.: US 11,914,938 B2
(45) Date of Patent: Feb. 27, 2024

(54) SIMULATION MODEL OF MULTILAYER CAPACITOR AND SIMULATION METHOD OF MULTILAYER CAPACITOR

(71) Applicant: Murata Manufacturing Co., Ltd., Nagaokakyo (JP)

(72) Inventor: Shinsuke Maeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 188 days.

(21) Appl. No.: 17/393,438

(22) Filed: Aug. 4, 2021

(65) Prior Publication Data

US 2022/0067257 A1 Mar. 3, 2022

(30) Foreign Application Priority Data

Aug. 27, 2020 (JP) ................................. 2020-143176

(51) Int. Cl.
 *G06F 30/367* (2020.01)

(52) U.S. Cl.
 CPC .................................. *G06F 30/367* (2020.01)

(58) Field of Classification Search
 CPC ..................................................... G06F 30/367
 See application file for complete search history.

(56) References Cited

U.S. PATENT DOCUMENTS

| | | | | |
|---|---|---|---|---|
| 2011/0307235 A1* | 12/2011 | Wu | ....................... | G06F 30/367 716/102 |
| 2013/0239083 A1* | 9/2013 | Ueno | .................... | G06F 30/367 716/136 |

FOREIGN PATENT DOCUMENTS

JP 2006-185182 A 7/2006

OTHER PUBLICATIONS

Kim et al. Equivalent-Circuit Model for High-Capacitance MLCC Based on Transmission-Line Theory IEEE Transactions on Components, Packaging and Manufacturing Technology, vol. 2, No. 6, Jun. 2012 (Year: 2012).*

Lakshminarayanan et al. A Substrate-Dependent CAD Model for Ceramic Multilayer Capacitors IEEE Transactions on Microwave Theory and Techniques, vol. 48, No. 10, Oct. 2000 (Year: 2000).*

* cited by examiner

*Primary Examiner* — Rehana Perveen
*Assistant Examiner* — Cuong V Luu
(74) *Attorney, Agent, or Firm* — Keating & Bennett, LLP

(57) ABSTRACT

A simulation model of a multilayer capacitor for three-dimensional electromagnetic simulation includes a pair of input/output ports, a plate-shaped first internal electrode model and a plate-shaped second internal electrode model between the pair of input/output ports. A capacitance, an equivalent series resistance, and an equivalent series inductance obtained from an actually measured value of an impedance characteristic of the multilayer capacitor are set for the first internal electrode model and the second internal electrode model. The first internal electrode model faces two side surfaces opposed in a width direction of the multilayer capacitor. The second internal electrode model faces two main surfaces opposed in a height direction intersecting the width direction of the multilayer capacitor.

9 Claims, 39 Drawing Sheets

SIMULATION MODEL OF MULTILAYER CAPACITOR AND SIMULATION METHOD OF MULTILAYER CAPACITOR

CROSS REFERENCE TO RELATED APPLICATIONS

This application claims the benefit of priority to Japanese Patent Application No. 2020-143176 filed on Aug. 27, 2020. The entire contents of this application are hereby incorporated herein by reference.

BACKGROUND OF THE INVENTION

1. Field of the Invention

The present invention relates to a simulation model of a multilayer capacitor, and a simulation method of a multilayer capacitor.

2. Description of the Related Art

When mounting a multilayer capacitor to a high-frequency electronic device, crosstalk occurs between the multilayer capacitor and its surrounding electronic components. For the analysis of this crosstalk, a simulation model of multilayer capacitors for three-dimensional electromagnetic field simulation has been demanded. Japanese Unexamined Patent Application Publication No. 2006-185182 discloses, as such a simulation model, a simulation model of an electronic component for a three-dimensional circuit simulator.

The simulation model of the electronic component disclosed in Japanese Unexamined Patent Application Publication No. 2006-185182 includes, in addition to the outer structure of the electronic component, the internal structure of the electronic component and a physical constant which is a constant indicating the characteristics of the electronic component. The physical constant includes a constant acting on the electromagnetic wave, and examples of the physical constant include a relative dielectric constant, electrical conductivity, relative magnetic permeability, a complex dielectric constant, complex magnetic permeability, and the like of the component composing the electronic component.

The time required for simulation is long when using a simulation model of a multilayer capacitor including an actual internal structure, i.e., an actual shape and actual number of internal electrodes (hereinafter, also referred to as an internal structure reflection model) as disclosed in Japanese Unexamined Patent Application Publication No. 2006-185182).

In this regard, the inventors of preferred embodiments of the present invention have developed a simulation model of a multilayer capacitor in which the actual shape and the actual number of internal electrodes are simulated by one plate-shaped internal electrode model for the purpose of shortening the simulation time. Hereinafter, this simulation model is also referred to as a surface element model. However, in this surface element model, the simulation results of crosstalk may deviate from the actually measured value due to the arrangement position of one plate-shaped internal electrode model in the three-dimensional electromagnetic field simulation. In other words, the simulation accuracy of crosstalk may be reduced.

SUMMARY OF THE INVENTION

Preferred embodiments of the present invention provide simulation models of multilayer capacitors and simulation methods of the multilayer capacitors for three-dimensional electromagnetic simulations that are each able to shorten a simulation time while reducing or preventing a decrease in the simulation accuracy of crosstalk.

A simulation model of a multilayer capacitor for three-dimensional electromagnetic simulation according to a preferred embodiment of the present invention includes a pair of input/output ports; a plate-shaped first internal electrode model provided between the pair of input/output ports; and a plate-shaped second internal electrode model between the pair of input/output ports. A capacitance C, an equivalent series resistance ESR, and an equivalent series inductance ESL obtained from an actually measured value of an impedance characteristic of the multilayer capacitor are set for the first internal electrode model and the second internal electrode model; the first internal electrode model faces two side surfaces opposed in a width direction of the multilayer capacitor; and the second internal electrode model faces two main surfaces opposed in a height direction intersecting the width direction of the multilayer capacitor.

A simulation method of a multilayer capacitor for three-dimensional electromagnetic simulation according to a preferred embodiment of the present invention includes providing a simulation model of a multilayer inductor between a first input/output port and a second input/output port, and providing a simulation model of the multilayer capacitor between a third input/output port and a fourth input/output port; and simulating a characteristic relating to crosstalk between the first input/output port and the fourth input/output port or between the third input/output port and the second input/output port by inputting a frequency sweep signal to the first input/output port or the third input/output port. The simulation model of the multilayer capacitor includes a plate-shaped first internal electrode model between the third input/output port and the fourth input/output port, and a plate-shaped second internal electrode model between the third input/output port and the fourth input/output port; a capacitance C, an equivalent series resistance ESR, and an equivalent series inductance ESL obtained from an actually measured value of an impedance characteristic of the multilayer capacitor are set for the first internal electrode model and the second internal electrode model; the first internal electrode model faces two side surfaces opposed in a width direction of the multilayer capacitor; and the second internal electrode model faces two main surfaces opposed in a height direction intersecting the width direction of the multilayer capacitor. The providing further includes providing the simulation model of the multilayer capacitor adjacent to the simulation model of the multilayer inductor, and the first internal electrode model or the second internal electrode model intersects a magnetic field from the simulation model of the multilayer inductor.

A simulation method of a multilayer capacitor for three-dimensional electromagnetic simulation according to a preferred embodiment of the present invention includes providing a simulation model of a multilayer inductor between a first input/output port and a second input/output port, and providing a simulation model of the multilayer capacitor between a third input/output port and a fourth input/output port; and simulating a characteristic relating to crosstalk between the first input/output port and the fourth input/output port or between the third input/output port and the second input/output port by inputting a frequency sweep signal to the first input/output port or the third input/output port. The simulation model of the multilayer capacitor includes a plate-shaped first internal electrode model between the third input/output port and the fourth input/ output port; a capacitance C, an equivalent series resistance ESR, and an equivalent series inductance ESL obtained from an actually measured value of an impedance characteristic of the multilayer capacitor are set for the first internal electrode model; the first internal electrode model faces two side surfaces opposed in a width direction of the multilayer capacitor, or faces two main surfaces opposed in a height direction intersecting the width direction of the multilayer capacitor. The providing further includes providing the simulation model of the multilayer capacitor adjacent to the simulation model of the multilayer inductor, and the first internal electrode model intersects a magnetic field from the simulation model of the multilayer inductor.

According to preferred embodiments of the present invention, it is possible to shorten the simulation time while reducing or preventing a decrease in the simulation accuracy of crosstalk in the three-dimensional electromagnetic simulation.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
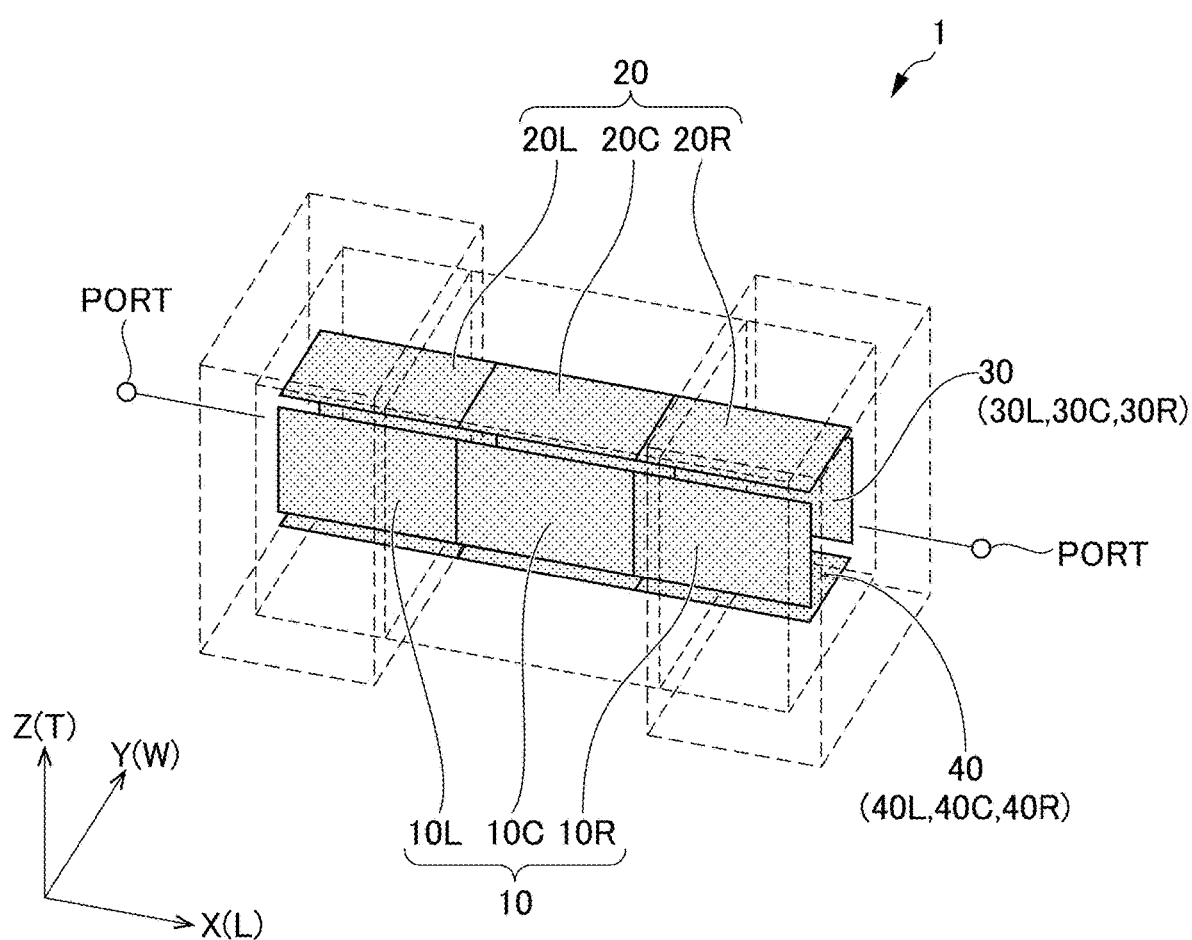
FIG. 1 is a perspective view showing a simulation model of a multilayer capacitor according to a preferred embodiment of the present invention.

Hereinafter, examples of preferred embodiments of the present invention will be described with reference to the accompanying drawings. It should be noted that the same reference numerals shall be used for the same or corresponding portions and elements in the drawings.

Background

Figure 15:
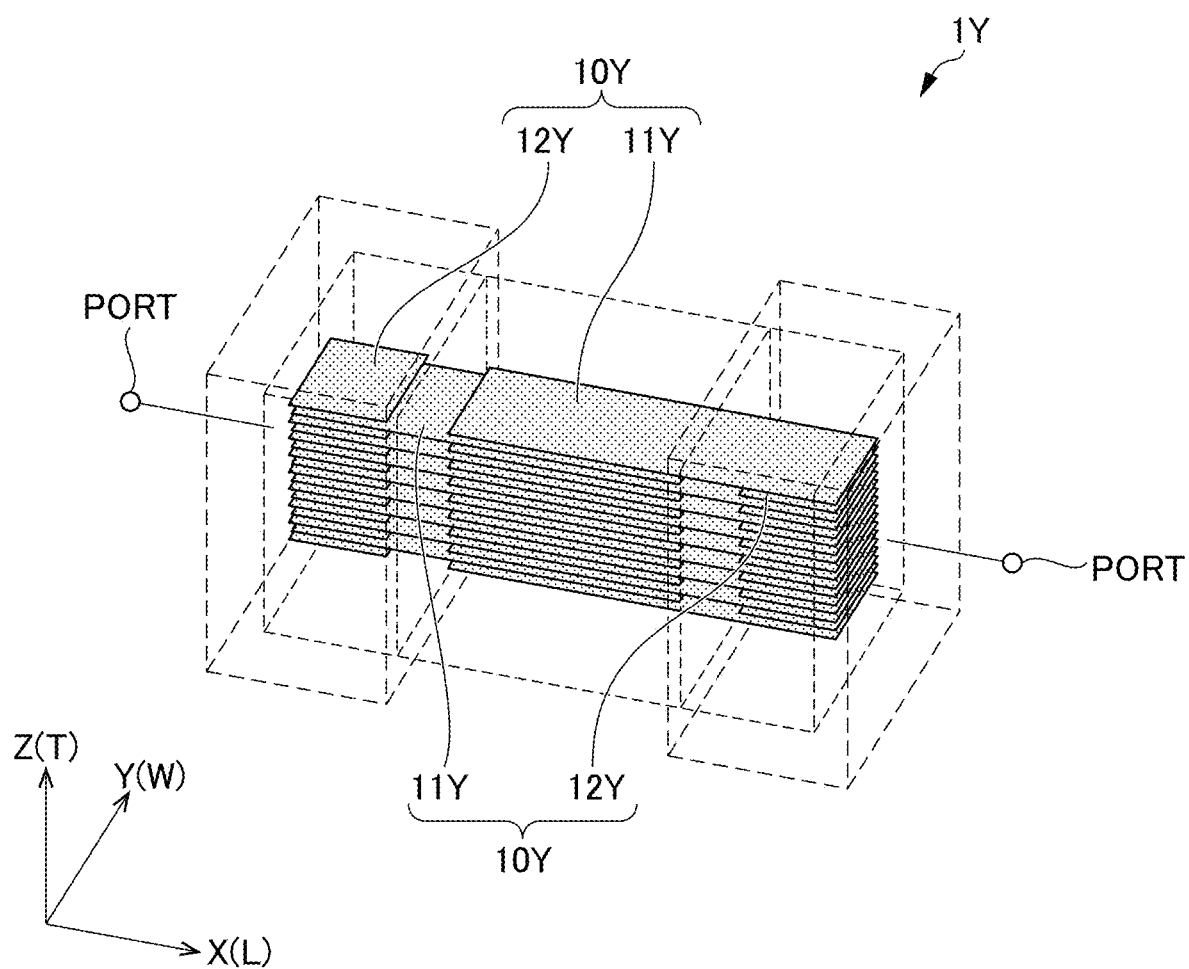
FIG. 15 is a perspective view showing a simulation model of an example of a conventional multilayer capacitor.

FIG. 15 is a perspective view showing a simulation model of an example of a conventional multilayer capacitor. A simulation model 1Y of a conventional multilayer capacitor shown in FIG. 15 is a model for three-dimensional electromagnetic field simulation using various analysis methods, such as the finite element method, the moment method, or the Finite Differential Time Domain (FDTD) method, for example.

FIG. 15 shows outer structures of a multilayer body (hereinafter, also referred to as elementary body) and external electrodes in the multilayer capacitor by a broken line. As shown by the broken line in FIG. 15, the multilayer capacitor includes a multilayer body including a plurality of internal electrodes and a plurality of dielectric layers that are stacked (or laminated), and external electrodes provided at the ends of the multilayer body. Examples of the material of the dielectric layer include various dielectric materials, such as ceramics.

Furthermore, FIG. 15 shows an XYZ orthogonal coordinate system. The X direction refers to the length direction L of the multilayer capacitor and the multilayer body, the Y direction refers to the width direction W of the multilayer capacitor and the multilayer body, and the Z direction refers to the height direction (hereinafter, also referred to as stacking direction) T of the multilayer capacitor and the multilayer body. The multilayer capacitor and the multilayer body each have a rectangular or substantially rectangular parallelepiped shape, and include two main surfaces opposed in the height direction T, two side surfaces opposed in the width direction W, and two end surfaces opposed in the length direction L. When the multilayer capacitor is mounted on the mounting board, the main surface of the multilayer capacitor faces a main surface of the mounting board, and the side surface and the end surface of the multilayer capacitor intersect the main surface of the mounting board. It should be noted that the term "intersect" includes "orthogonal" in the present disclosure.

As shown in FIG. 15, the simulation model 1Y of an example of the conventional multilayer capacitor (conventional example) includes a pair of input/output ports PORT, an actual internal structure provided between the pair of input/output ports PORT, i.e., the actual shape and the actual number of internal electrodes 10Y, and a plurality of dielectric layers. Hereinafter, the simulation model 1Y is also referred to as an internal structure reflection model. In the example of FIG. 15, the internal electrode 10Y includes an internal electrode portion 11Y integrally provided with one charge extraction electrode, and the other charge extraction electrode portion 12Y.

The simulation model 1Y of the conventional multilayer capacitor is determined by performing a fitting to the actually measured value of the impedance characteristics Z and the equivalent series resistance ESR of the multilayer capacitor, for example, while changing the conductivity of the internal electrode and the dielectric constant of the dielectric layer. Thus, the simulation model 1Y of the conventional multilayer capacitor is established as a model in which, for example, the conductivity of the actual internal electrode, the dielectric constant of the actual dielectric layer, the capacitive component, and the inductor component, or the like due to the actual structure are reflected.

According to the simulation model 1Y of the conventional multilayer capacitor, since it includes the actual internal structure, the simulation accuracy of crosstalk between the multilayer capacitor and its surrounding electronic components is relatively high. However, according to the simulation model 1Y of this conventional multilayer capacitor, since it includes the actual internal structure (i.e., actual shape and actual number of internal electrodes 10Y), the time required for simulation is relatively long.

In this regard, the inventors of preferred embodiments of the present invention developed a simulation model of a multilayer capacitor in which the actual shape and the actual number of internal electrodes are simulated by one plate-shaped internal electrode model for the purpose of shortening the simulation time. Hereinafter, this simulation model is also referred to as a surface element model.

Figure 13:
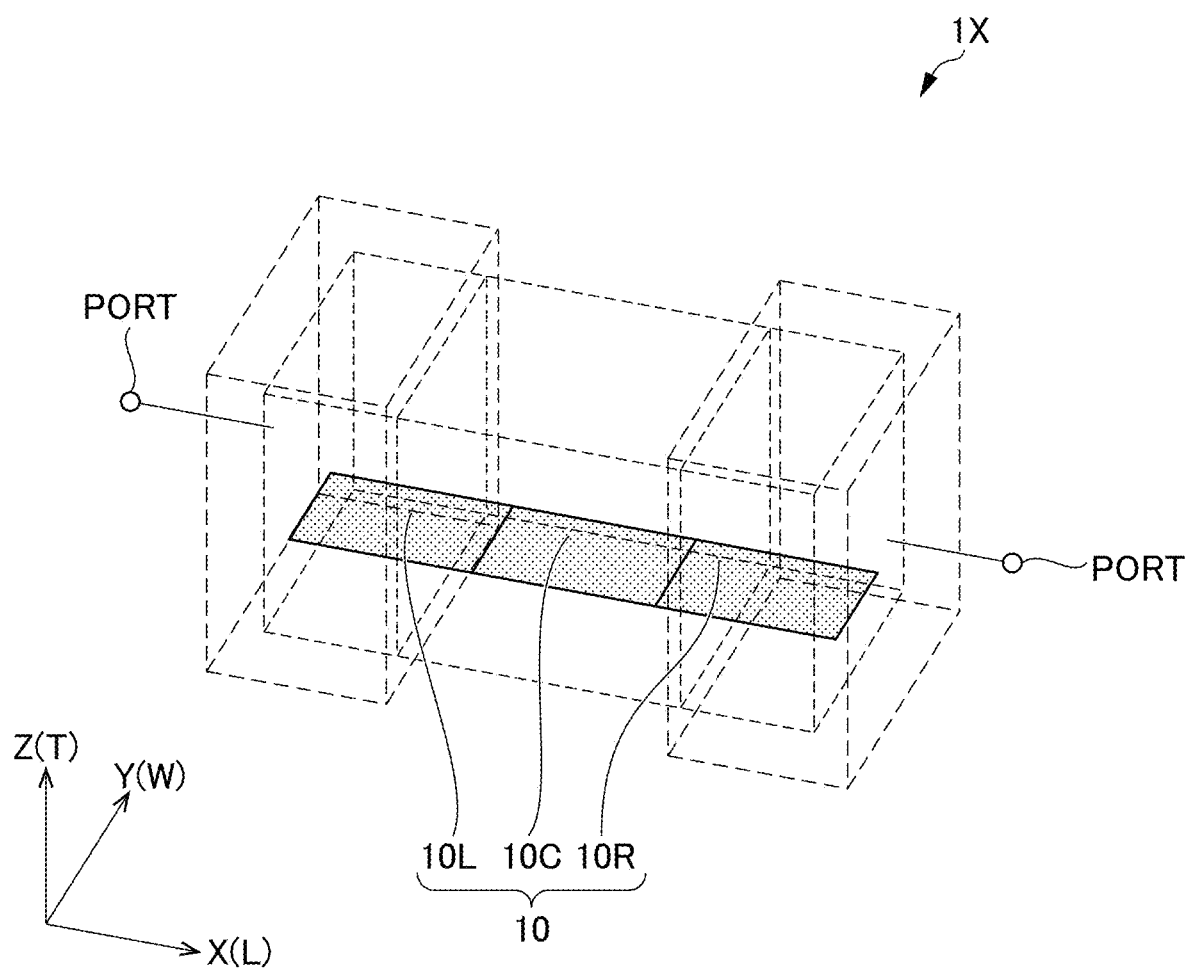
FIG. 13 is a perspective view showing a simulation model of a multilayer capacitor of a comparative example.

FIG. 13 is a perspective view showing a simulation model of a multilayer capacitor of a comparative example. The simulation model 1X of the multilayer capacitor of the comparative example shown in FIG. 13 is a model for three-dimensional electromagnetic field simulation using various analysis methods, such, for example, as the finite element method, the moment method, or the FDTD method as described above. FIG. 13 also shows outer structures of a multilayer body (hereinafter, also referred to as elementary body) and external electrodes in the multilayer capacitor by a broken line. FIG. 13 also shows the XYZ orthogonal coordinate system.

As shown in FIG. 13, a simulation model 1X of the multilayer capacitor of the comparative example includes a pair of input/output ports PORT, and a single plate-shaped internal electrode model 10 provided between the pair of input/output ports PORT. The simulation model 1X of the multilayer capacitor of the comparative example includes the internal electrode model 10 at the position of the lowermost layer of the actual internal electrode.

In the internal electrode model 10, the capacitance C, the equivalent series resistance ESR, and the equivalent series inductance ESL obtained from the actually measured value of the impedance characteristics of the multilayer capacitor are set. In FIG. 13, the internal electrode model 10 includes the three portions 10L, 10C, and 10R connected in series. The equivalent series inductance ESL is set in the portion 10L, the capacitance C is set in the portion 10C, and the equivalent series resistance ESR is set in the portion 10R.

The capacitances C, the equivalent series resistance ESR, and the equivalent series inductance ESL are, for example, determined by performing a fitting to the actually measured values of the impedance characteristic Z and the equivalent series resistance ESR of the multilayer capacitor using the following expression:

$$Z=ESL+(1/j\omega C)+ESR$$

Thus, the simulation model 1X of the multilayer capacitor of the comparative example is established as a model in which, for example, the conductivity of the actual internal electrode, the dielectric constant of the actual dielectric layer, the capacitive component, and the inductor component, or the like due to the actual structure are reflected.

According to the simulation model 1X of the multilayer capacitor of this comparative example, since it includes a single internal electrode model 10, the time required for simulation is relatively short. However, according to the simulation model 1X of the multilayer capacitor of this comparative example, since the single internal electrode model 10 is provided at the position of the lowermost layer of the actual internal electrode, a simulation result of crosstalk may deviate from the actually measured value in the three-dimensional electromagnetic field simulation. In other words, the simulation accuracy of crosstalk may be reduced. A detailed analysis will be described later.

Therefore, the inventors of preferred embodiments of the present invention developed a simulation model of a multilayer capacitor for three-dimensional electromagnetic simulation that can shorten a simulation time while reducing or preventing a decrease in the simulation accuracy of crosstalk. In the following, a description is provided of a simulation model of a multilayer capacitor according to a preferred embodiment of the present invention.

Simulation Model of Multilayer Capacitor According to a Preferred Embodiment of the Present Invention FIG. 1 is a perspective view showing a simulation model of a multilayer capacitor according to a preferred embodiment of the present application. A simulation model 1 of the multilayer capacitor shown in FIG. 1 is a model for three-dimensional electromagnetic field simulation using various analysis methods such as, for example, the finite element method, the moment method, or the FDTD method as described above. FIG. 1 also shows outer structures of a multilayer body (hereinafter, also referred to as elementary body) and external electrodes in a multilayer capacitor by a broken line. FIG. 1 also shows the XYZ orthogonal coordinate system.

As shown in FIG. 1, the simulation model 1 of the multilayer capacitor includes a pair of input/output ports PORT, a first internal electrode model 10, a second internal electrode model 20, a third internal electrode model 30, and a fourth internal electrode model 40. The first internal electrode model 10, the second internal electrode model 20, the third internal electrode model 30, and the fourth internal electrode model 40 are each a plate-shaped internal electrode model provided between the pair of input/output ports PORT.

The first internal electrode model 10 and the third internal electrode model 30 each face the two side surfaces of the multilayer capacitor. The first internal electrode model 10 is close to one of the two side surfaces, and thus provided at a position of the edge portion close to one of the side surfaces of an actual internal electrode. The third internal electrode model 30 is close to the other one of the two side surfaces, and thus provided at a position of the edge portion close to the other of the side surfaces of the actual internal electrode. It should be noted that the arrangement positions of the first internal electrode model 10 and the third internal electrode model 30 are not limited thereto. For example, either one of the first internal electrode model 10 and the third internal electrode model 30 may be provided near the center between the two side surfaces, and thus provided near the center between the edge portion close to one side surface and the edge portion close to the other side surface of the actual internal electrode.

The second internal electrode model 20 and the fourth internal electrode model 40 each face the two main surfaces of the multilayer capacitor. The second internal electrode model 20 is close to one of the two main surfaces, and thus provided at the position close to the uppermost layer of the actual internal electrode. The fourth internal electrode model 40 is close to the other of the two main surfaces, and thus provided at the position close to the lowermost layer of the actual internal electrode. It should be noted that the arrangement positions of the second internal electrode model 20 and the fourth internal electrode model 40 are not limited thereto. For example, either one of the second internal electrode model 20 and the fourth internal electrode model 40 may be provided near the center between the two main surfaces, and thus provided near the center between the uppermost layer and the lowermost layer of the actual internal electrodes.

In other words, the first internal electrode model 10 and the third internal electrode model 30 are provided, for example, perpendicular or substantially perpendicular to the main surface of the mounting board so as to intersect the main surface of the mounting board. The second internal electrode model 20 and the fourth internal electrode model 40 are provided, for example, parallel or substantially parallel to the main surface of the mounting board so as to face the main surface of the mounting board.

In the first internal electrode model 10, the second internal electrode model 20, the third internal electrode model 30 and the fourth internal electrode model 40, the capacitance C, the equivalent series resistance ESR, and the equivalent series inductance ESL obtained from the actually measured value of the impedance characteristics of the multilayer capacitor are set. The capacitance C, the equivalent series resistance ESR, and the equivalent series inductance ESL may be evenly provided, or alternatively weighted and unevenly provided for the four internal electrode models.

The capacitance C, the equivalent series resistance ESR, and the equivalent series inductance ESL are, for example, determined by performing a fitting to the actually measured value of the impedance characteristic Z and the equivalent series resistance ESR of the multilayer capacitor using the following expression:

$$Z=ESL+(1/j\omega C)+ESR$$

In a case in which a three-dimensional electromagnetic field simulator includes a series model of LCR, an internal electrode model may be created from one series model. On the other hand, in a case in which the three-dimensional electromagnetic field simulator includes a parallel model of LCR, three parallel models of LCR may be used, and a model of L only, a model of C only, and a model of R only may be connected in series.

In the example of FIG. 1, the first internal electrode model 10 includes the three portions 10L, 10C, and 10R connected in series. The equivalent series inductance ESL is set in the portion 10L, the capacitance C is set in the portion 10C, and the equivalent series resistance ESR is set in the portion 10R. Similarly, the second internal electrode model 20 includes the three portions 20L, 20C, and 20R connected in series. The equivalent series inductance ESL is set in the portion 20L, the capacitance C is set in the portion 20C, and the equivalent series resistance ESR is set in the portion 20R. Similarly, the third internal electrode model 30 includes the three portions 30L, 30C, and 30R connected in series. The equivalent series inductance ESL is set in the portion 30L, the capacitance C is set in the portion 30C, and the equivalent series resistance ESR is set in the portion 30R. Similarly, the fourth internal electrode model 40 includes the three portions 40L, 40C, and 40R connected in series. The equivalent series inductance ESL is set in the portion 40L, the capacitance C is set in the portion 40C, and the equivalent series resistance ESR is set in the portion 40R.

Thus, the first internal electrode model 10, the second internal electrode model 20, the third internal electrode model 30, and the fourth internal electrode model 40 are established as models in which, for example, the conductivity of the actual internal electrode, the dielectric constant of the actual dielectric layer, and the capacitive component and the inductor component, or the like due to the actual structure are reflected.

Figure 2:
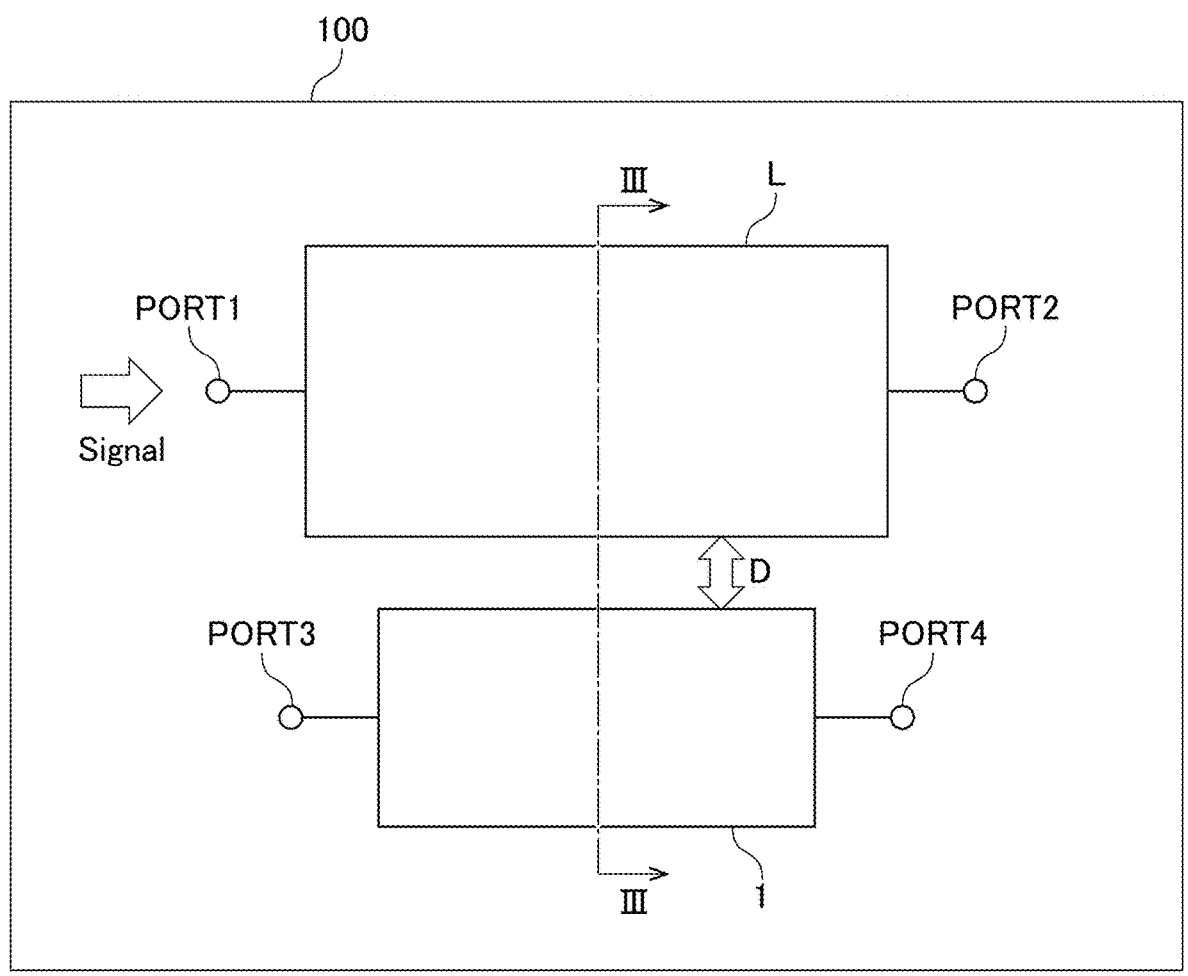
FIG. 2 is a plan view showing a simulation model of a multilayer capacitor and a simulation model of a multilayer inductor according to a preferred embodiment of the present invention.
Figure 3:
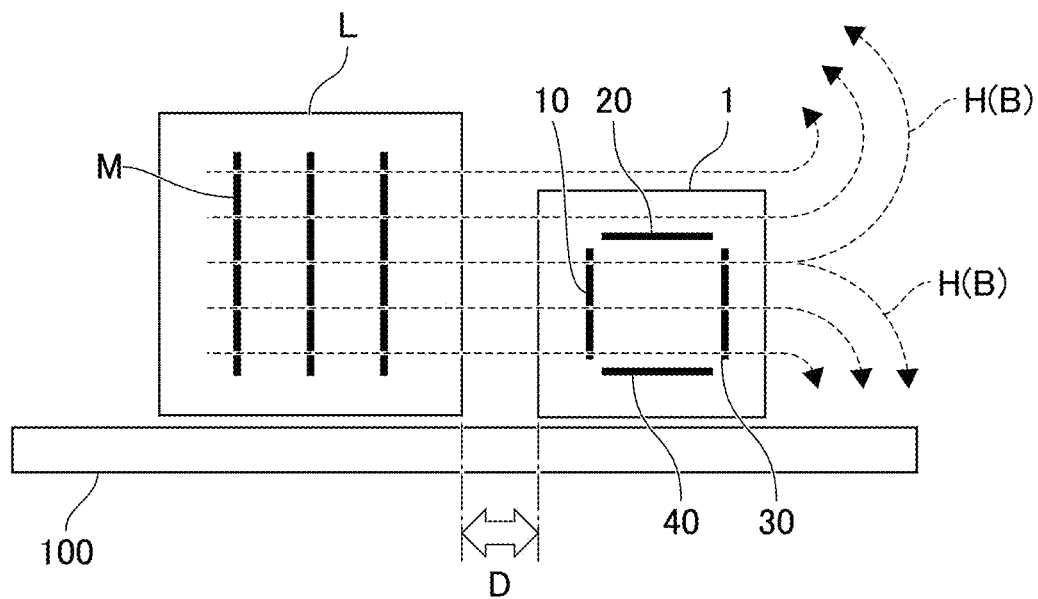
FIG. 3 is a cross-sectional view taken along the line of the simulation model shown in FIG. 2.
Figure 4:
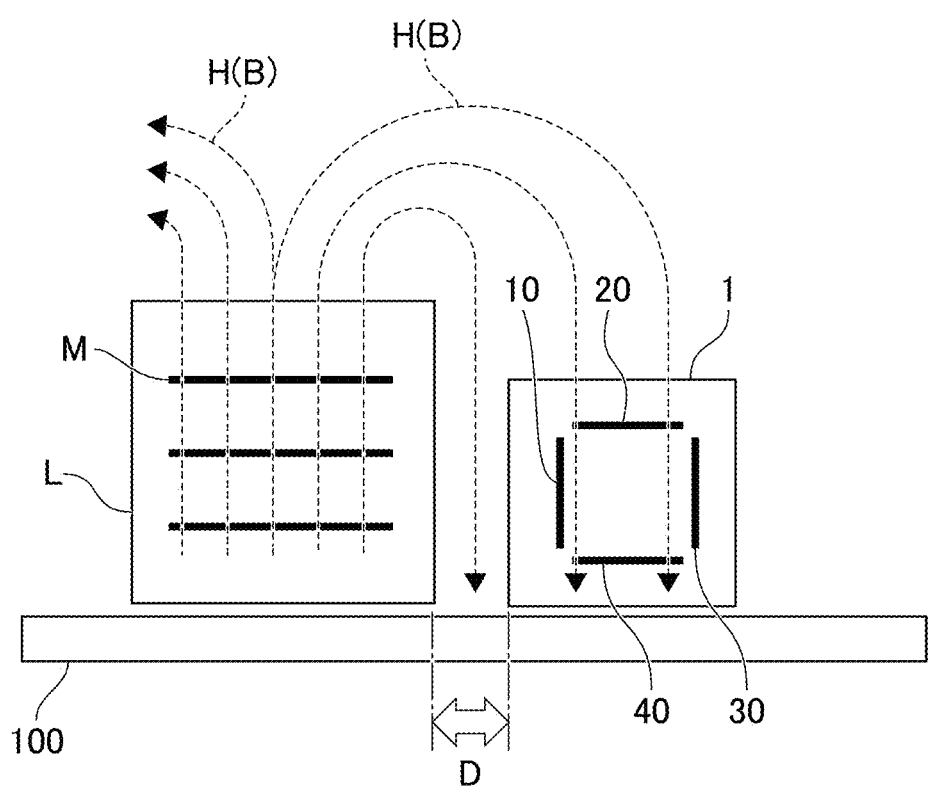
FIG. 4 is a cross-sectional view taken along the line of the simulation model shown in FIG. 2.

Simulation Method of Multilayer Capacitor According to a Preferred Embodiment of the Present Invention Next, with reference to FIGS. 2 to 4, a description will be provided of a simulation method of a multilayer capacitor for three-dimensional electromagnetic field simulation, more specifically, a simulation method for crosstalk analysis between a multilayer capacitor and surrounding electronic components using the simulation model 1 of the multilayer capacitor described above. FIG. 2 is a plan view showing a simulation model of the multilayer capacitor and a simulation model of a multilayer inductor according to a preferred embodiment of the present application. FIGS. 3 and 4 are each a cross-sectional view taken along the line III-III of the simulation model shown in FIG. 2.

First, the simulation model L of the multilayer inductor is provided between a first input/output port PORT1 and a second input/output port PORT2. Furthermore, the simulation model 1 of the multilayer capacitor is provided between the third input/output port PORT3 and the fourth input/output port PORT4 (referred to as a step of providing). At this time, the mounting board 100 may be provided in which the simulation model L of the multilayer inductor and the simulation model 1 of the multilayer capacitor are mounted.

The simulation model 1 of the multilayer capacitor is provided such that:
the simulation model 1 of the multilayer capacitor is adjacent to the simulation model L of the multilayer inductor at a desired distance D; and
the first internal electrode model 10 and the third internal electrode model 30 (FIG. 3), or the second internal electrode model 20 and the fourth internal electrode model 40 (FIG. 4) intersect (for example, perpendicular or substantially perpendicular to) the magnetic field H (i.e., the magnetic flux B) from the simulation model L of the multilayer inductor.

Here, the multilayer inductor includes a multilayer body (hereinafter, also referred to as elementary body) in which a plurality of coil-shaped inner conductors and a plurality of magnetic layers are stacked, and external electrodes provided at the ends of the multilayer body. Examples of the material of the magnetic layer include various magnetic materials such, as magnetic ceramic.

The simulation model L of the multilayer inductor is established as a model for three-dimensional electromagnetic field simulation using various analytical methods, such as, for example, the finite element method, the moment method, or the FDTD method.

The simulation model L of the multilayer inductor includes an actual internal structure, i.e., an actual shape and actual number of inner conductors M and a plurality of magnetic layers. The simulation model L of the multilayer inductor is determined by performing fitting to the actually measured value of the impedance characteristic Z and the equivalent series resistance ESR of the multilayer inductor, for example, while varying the conductivity of the inner conductors and the magnetic permeability of the magnetic layers. Thus, the simulation model L of the multilayer inductor is established as a model in which, for example, the conductivity of the actual inner conductors, the magnetic permeability of the actual magnetic layers, and the capacitive component, or the like due to the actual structure are reflected.

The example of FIG. 3 illustrates a case in which the stacking direction of the multilayer inductor corresponds to the width direction of the multilayer inductor, in other words, a case in which the stacking direction of the multilayer inductor corresponds to a direction along the main surface of the mounting board 100. Such a multilayer inductor is referred to as a vertical winding multilayer inductor. In this case, the direction of the magnetic field H, i.e., the direction of the magnetic flux B, from the simulation model L of the multilayer inductor corresponds to the width direction of the multilayer inductor, i.e., the direction along the main surface of the mounting board 100. In this case, the first internal electrode model 10 and the third internal electrode model 30 of the simulation model 1 of the multilayer capacitor intersect (e.g., is perpendicular or substantially perpendicular to) the magnetic field H, i.e., the magnetic flux B, from the simulation model L of the multilayer inductor, for example.

On the other hand, the example of FIG. 4 illustrates a case in which the stacking direction of the multilayer inductor corresponds to the height direction of the multilayer inductor, in other words, a case in which the stacking direction of the multilayer inductor corresponds to a direction intersecting the main surface of the mounting board 100. Such a multilayer inductor is referred to as a horizontal winding multilayer inductor. In this case, the direction of the magnetic field H, i.e., the direction of the magnetic flux B, from the simulation model L of the multilayer inductor corresponds to the height direction of the multilayer inductor, i.e., the direction intersecting the main surface of the mounting board 100. In this case, the second internal electrode model 20 and the fourth internal electrode model 40 of the simulation model 1 of the multilayer capacitor intersect (e.g., perpendicular or substantially perpendicular to) the magnetic field H, in other words, the magnetic flux B, from the simulation model L of the multilayer inductor, for example.

Next, a frequency sweep signal is inputted to the first input/output port PORT1 to simulate the characteristics of the crosstalk between the first input/output port PORT1 and the fourth input/output port PORT4 (referred to as a step of simulating). Alternatively, a frequency sweep signal is inputted to the third input/output port 3 to simulate the characteristics of the crosstalk between the third input/output port PORT3 and the second input/output port PORT2 (referred to as a step of simulating).

Examples of the characteristics related to crosstalk include a transmission characteristic S41 from the first input/output port PORT1 to the fourth input/output port PORT4, a transmission characteristic S23 from the third input/output port PORT3 to the second input/output port PORT2, mutual inductance between the multilayer inductor and the multilayer capacitor, and the like.

In the following, a description will be provided of an example of the simulation result of crosstalk between the simulation model 1 of the multilayer capacitor of the present preferred embodiment and the simulation model L of the multilayer inductor, an example of the simulation result of crosstalk between the simulation model 1X of the multilayer capacitor of the comparative example and the simulation model L of the multilayer inductor, and an example of the simulation result of crosstalk between the simulation model 1Y of the multilayer capacitor of the conventional example and the simulation model L of the multilayer inductor, by the simulation method of the multilayer capacitor described above. As the crosstalk characteristics, the simulation of the transmission characteristic S41 and the resonance frequency was performed.

The simulation model 1 of the multilayer capacitor of the present preferred embodiment, the simulation model 1X of the multilayer capacitor of the comparative example, and the simulation model 1Y of the multilayer capacitor of the conventional example are each a model of the following multilayer ceramic capacitor.

Multilayer Ceramic Capacitor: capacitance about 10 pF, size 0402 (length direction L dimension is about 0.4 mm, width direction W dimension is about 0.2 mm, and height direction T dimension is about 0.2 mm).

The simulation model L of the multilayer inductor is a model of the following multilayer ceramic inductor.

Multilayer ceramic inductor: vertical winding type as shown in FIG. 3, inductance about 56 nH, size 0402 (length direction L dimension is about 0.4 mm, width direction W dimension is about 0.2 mm, and height direction T dimension is about 0.3 mm).

Figure 5:
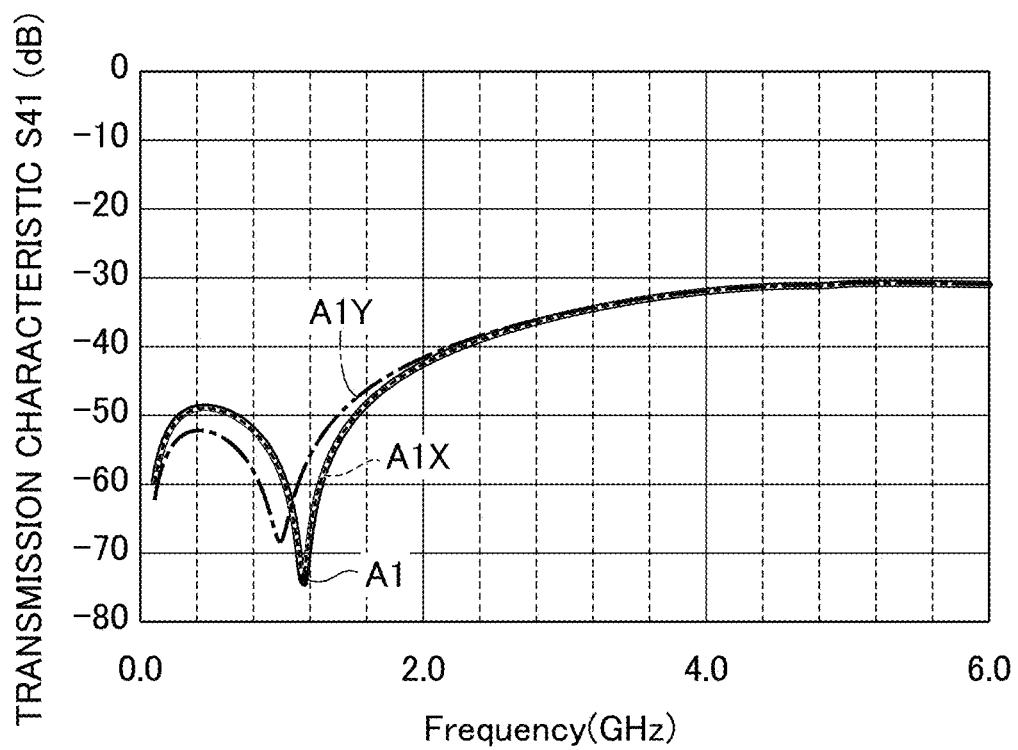
FIG. 5 is an example of a simulation result of a transmission characteristic S41 by the simulation method shown in FIGS. 2 and 3.

FIG. 5 is an example of a simulation result of the transmission characteristic S41 by the simulation method shown in FIGS. 2 and 3. The distances D between the simulation models 1, 1X, and 1Y of the multilayer capacitor and the simulation model L of the multilayer inductor are about 60 µm. The characteristic A1 of the solid line indicates a simulation result of the simulation model 1 of the multilayer capacitor of the present preferred embodiment of the present application shown in FIG. 1. The characteristic A1X of the dotted line indicates a simulation result of the simulation model 1X of the multilayer capacitor of the comparative example shown in FIG. 13. The characteristic A1Y of the one dot chain line indicates a simulation result of the simulation model 1Y of the multilayer capacitor of the conventional example shown in FIG. 15.

Figure 6:
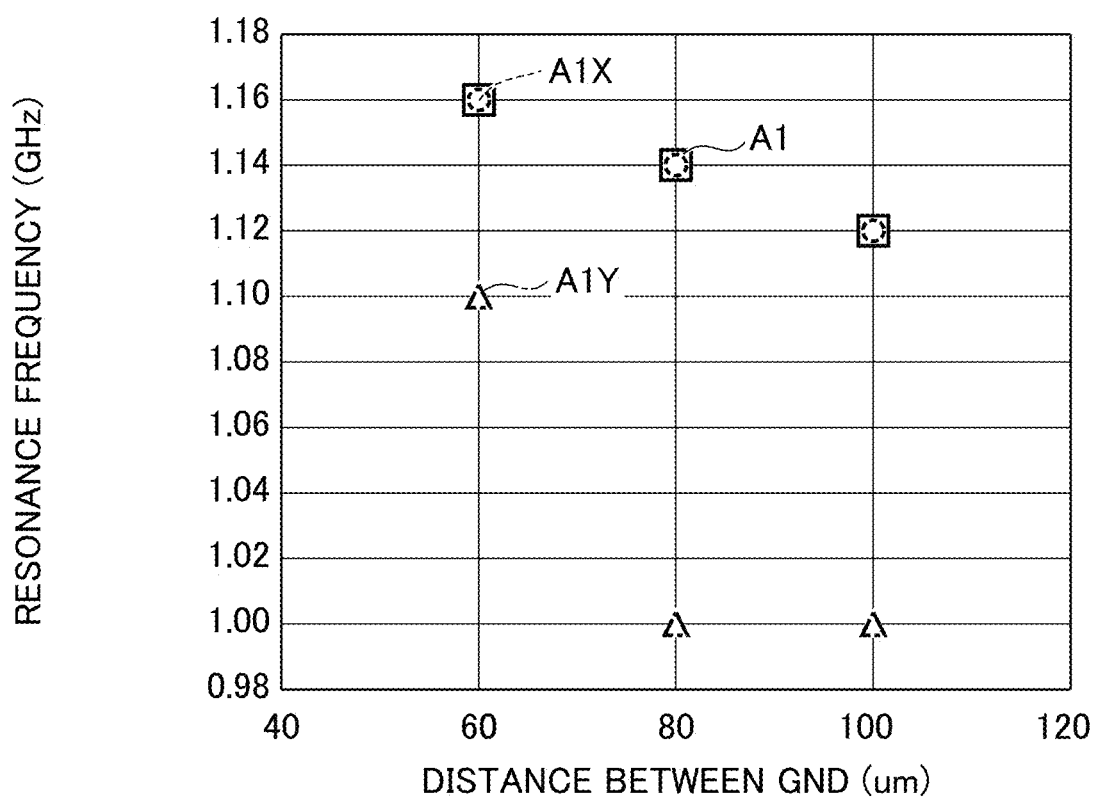
FIG. 6 is an example of a simulation result of a resonant frequency by the simulation method shown in FIGS. 2 and 3.

FIG. 6 is an example of a simulation result of the resonant frequency by the simulation method shown in FIGS. 2 and 3. The distances D between the simulation models 1, 1X and 1Y of the multilayer capacitor, and the simulation model L of the multilayer inductor are about 60 µm, about 80 µm, and about 100 µm, respectively. The characteristic A1 of the square (solid line) indicates a simulation result of the simulation model 1 of the multilayer capacitor of the present preferred embodiment of the present application shown in FIG. 1. The characteristic A1X of the circle (dotted line) indicates a simulation result of the simulation model 1X of the multilayer capacitor of the comparative example shown in FIG. 13. The characteristic A1Y of the triangle (one dot chain line) indicates a simulation result of the simulation model 1Y of the multilayer capacitor of the conventional example shown in FIG. 15.

According to FIGS. 5 and 6, as described above, in the simulation model 1X of the multilayer capacitor of the comparative example, the transmission characteristic S41 and the resonant frequency characteristics are deviated from the simulation model 1Y of the multilayer capacitor of the conventional example which follows the actually measured value. In other words, the crosstalk characteristics are deviated. On the contrary, in the simulation model 1 of the multilayer capacitor of the present preferred embodiment, the deviation of the transmission characteristic S41 and the resonant frequency characteristics from the simulation model 1Y of the conventional multilayer capacitor which follows the actually measured value are reduced or prevented. In other words, the deviation of the crosstalk characteristics is reduced or prevented. The inventors of preferred embodiments of the present application describe the results as follows.

Figure 14:
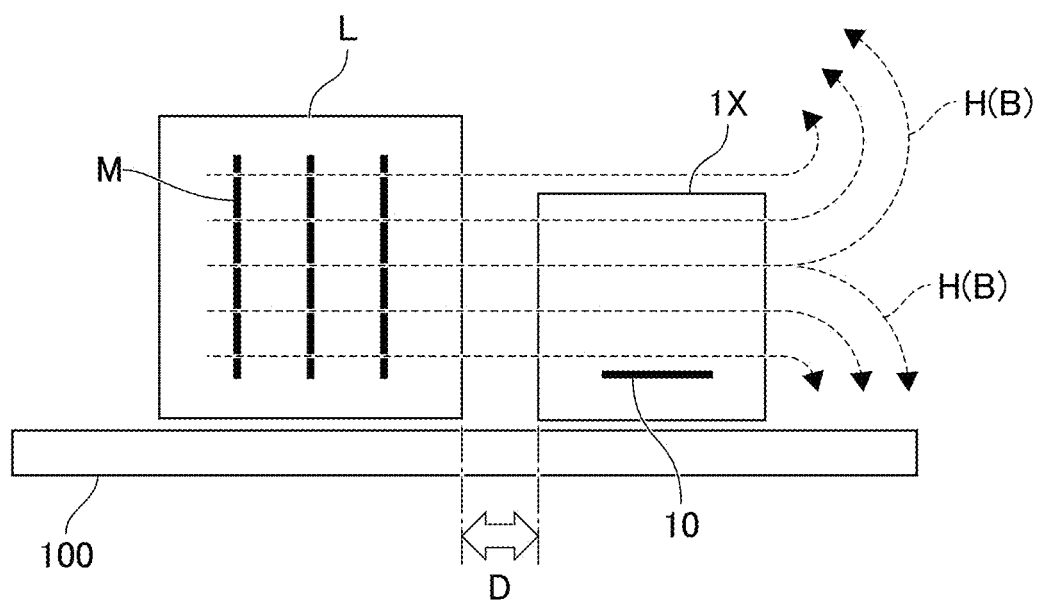
FIG. 14 is a cross-sectional view of a simulation model of the comparative example, and is a cross-sectional view corresponding to the III-III line shown in FIG. 2.

As shown in FIG. 14, the multilayer capacitor is lower in height than the multilayer inductor. Furthermore, in a case in which the simulation model L of the multilayer inductor is a vertical winding type, the magnetic field H, i.e., the magnetic flux B, corresponds to the direction along the main surface of the mounting board 100, for example, the parallel or substantially parallel direction thereto.

In this case, in the simulation model 1X of the multilayer capacitor of the comparative example, there is one internal electrode model 10, and this single internal electrode model 10 is provided only at the position of the lowermost layer of the actual internal electrode. Therefore, as shown in FIG. 14, it is hardly susceptible to the magnetic field H, i.e., the magnetic flux B, from the simulation model L of the multilayer inductor. Therefore, it is considered that the transmission characteristic S41 and the resonance frequency are deviated, and thus, the crosstalk characteristics are deviated.

On the contrary, according to the simulation model 1 of the multilayer capacitor of the present preferred embodiment of the present application, as shown in FIG. 3, the first internal electrode model 10 and the third internal electrode model 30 intersect (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is considered that it is possible to reduce or prevent a decrease in the simulation accuracy of the transmission characteristic S41 and the resonance frequency, and thus, it is possible to reduce or prevent a decrease in the simulation accuracy of crosstalk.

Furthermore, the simulation model 1 of the multilayer capacitor of the present preferred embodiment of the present application includes the second internal electrode model 20 and the fourth internal electrode model 40 each facing the main surface of the multilayer capacitor, in addition to the first internal electrode model 10 and the third internal electrode model 30 each facing the side surface of the multilayer capacitor. Thus, as shown in FIG. 4, even if the multilayer inductor is a horizontal winding type, since the second internal electrode model 20 and the fourth internal electrode model 40 intersect (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is considered that it is possible to reduce or prevent a decrease in the simulation accuracy of the transmission characteristic S41 and the resonance frequency, i.e., it is possible to reduce or prevent a decrease in the simulation accuracy of crosstalk.

It should be noted that the above description is based on an example of a simulation result of the simulation model of a 0402 multilayer capacitor. However, the present invention is not limited thereto, and it is considered that the description is applicable to a simulation model of a multilayer capacitor of various sizes, such as 0201 type (length direction L dimension is about 0.2 mm, width direction W dimension is about 0.1 mm, height direction T dimension is about 0.1 mm), and 0603 type (length direction L dimension is about 0.6 mm, width direction W dimension is about 0.3 mm, height direction T dimension is about 0.3 mm).

Furthermore, although the description above is based on an example of the simulation results in a case in which the distance D between the simulation model of the multilayer capacitor and the simulation model of the multilayer inductor is about 60 μm, about 80 μm, and about 100 μm, the present invention is not limited thereto, and it can be considered to be applied to a case in which the distance D is about 50 μm or more and about 100 μm or less, for example.

As described above, according to the simulation model 1 of the multilayer capacitor of the present preferred embodiment of the present application, as compared with the simulation model 1X of the multilayer capacitor of the comparative example shown in FIG. 13, it is possible to reduce or prevent a decrease in the simulation accuracy of crosstalk in the three-dimensional electromagnetic field simulation. Furthermore, since the simulation model 1 of the multilayer capacitor of the present preferred embodiment of the present application only includes the first internal electrode model 10, the second internal electrode model 20, the third internal electrode model 30, and the fourth internal electrode model 40, it is possible to shorten the simulation time of the three-dimensional electromagnetic field simulation, as compared with the simulation model 1Y of the conventional multilayer capacitor shown in FIG. 15.

While the present preferred embodiment of the present invention has been described above, the present invention is not limited to the above-described preferred embodiment, and various changes and modifications can be made. For example, in the preferred embodiment described above, the simulation model 1 of the multilayer capacitor is exemplified which includes the four plate-shaped models including the first internal electrode model 10, the second internal electrode model 20, the third internal electrode model 30, and the fourth internal electrode model 40. However, the present invention is not limited to this, and the number and arrangement of the internal electrode models can be modified as shown in FIGS. 7A to 7I, FIGS. 8A to 8I, FIGS. 9A to 9C, FIGS. 10A to 10C, FIGS. 11A to 11C, and FIGS. 12A to 12C.

MODIFIED EXAMPLE 1

Figure 7A:
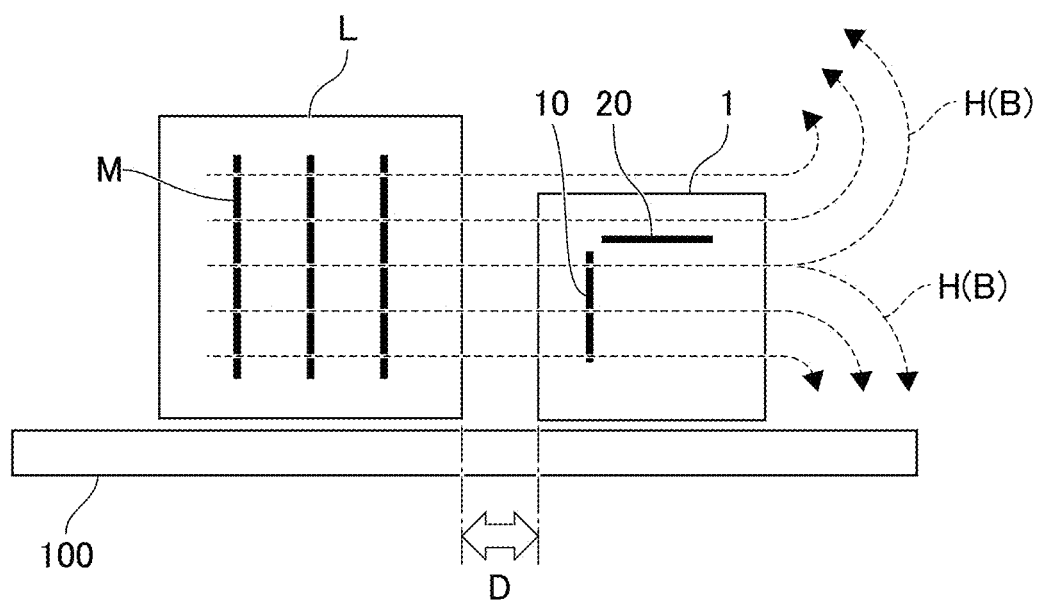
FIG. 7A is a cross-sectional view of a simulation model according to Modified Example 1 of a preferred embodiment of the present invention, and is a cross-sectional view corresponding to the line shown in FIG. 2.
Figure 8A:
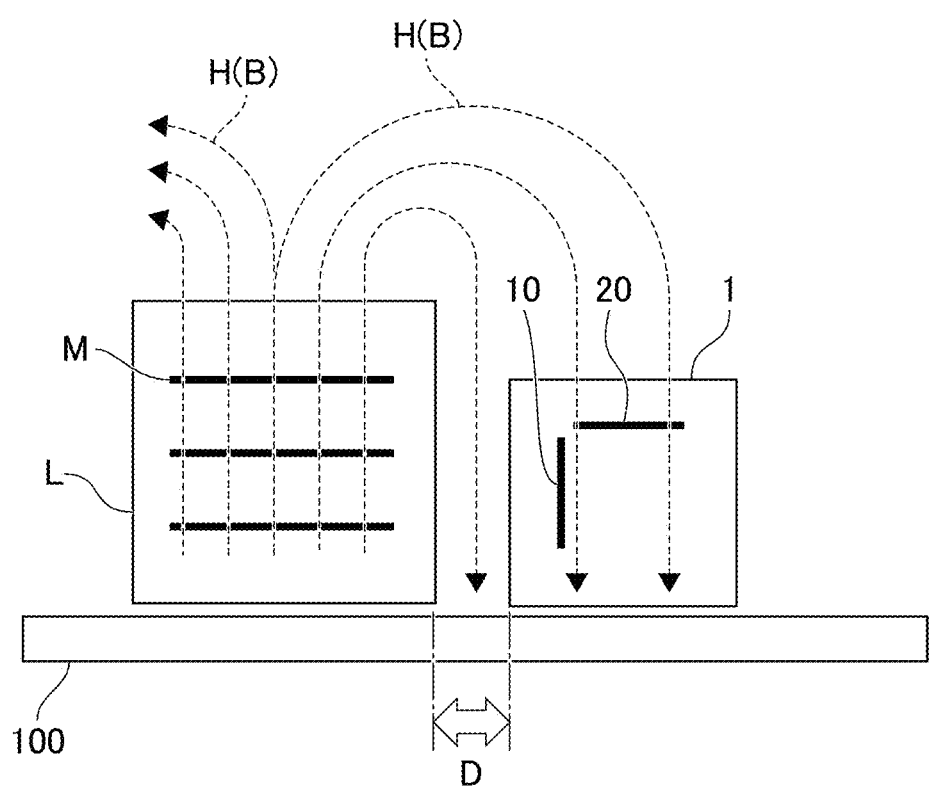
FIG. 8A is a cross-sectional view of a simulation model according to Modified Example 1, and is a cross-sectional view corresponding to the line III-III shown in FIG. 2.

As shown in FIG. 7A and FIG. 8A, the simulation model 1 of the multilayer capacitor may include only two plate-shaped internal electrode models including the first internal electrode model 10 and the second internal electrode model 20 in the simulation model 1 of the multilayer capacitor shown in FIG. 3. That is, the simulation model 1 of the multilayer capacitor may include only the first internal electrode model 10 facing the side surface of the multilayer capacitor, and the second internal electrode model 20 facing the main surface of the multilayer capacitor.

In this case, the capacitance C, the equivalent series resistance ESR, and the equivalent series inductance ESL obtained from the actually measured value of the impedance characteristics of the multilayer capacitor are set for the first internal electrode model 10 and the second internal electrode model 20. The capacitance C, the equivalent series resistance ESR, and the equivalent series inductance ESL may be evenly provided, or alternatively may be weighted and unevenly provided for the two internal electrode models.

Thus, as shown in FIG. 7A, even if the multilayer inductor is a vertical winding type, since the first internal electrode model 10 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Furthermore, as shown in FIG. 8A, even if the multilayer inductor is a horizontal winding type, the second internal electrode model 20 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 7B:
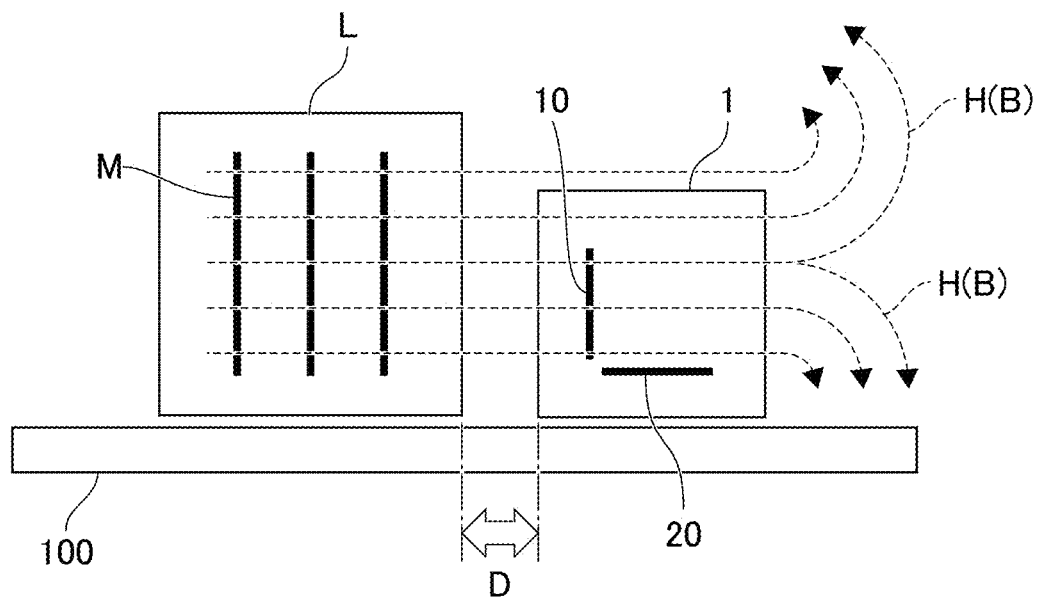
FIG. 7B is a cross-sectional view of a simulation model according to Modified Example 1, and is a cross-sectional view corresponding to the line shown in FIG. 2.
Figure 7C:
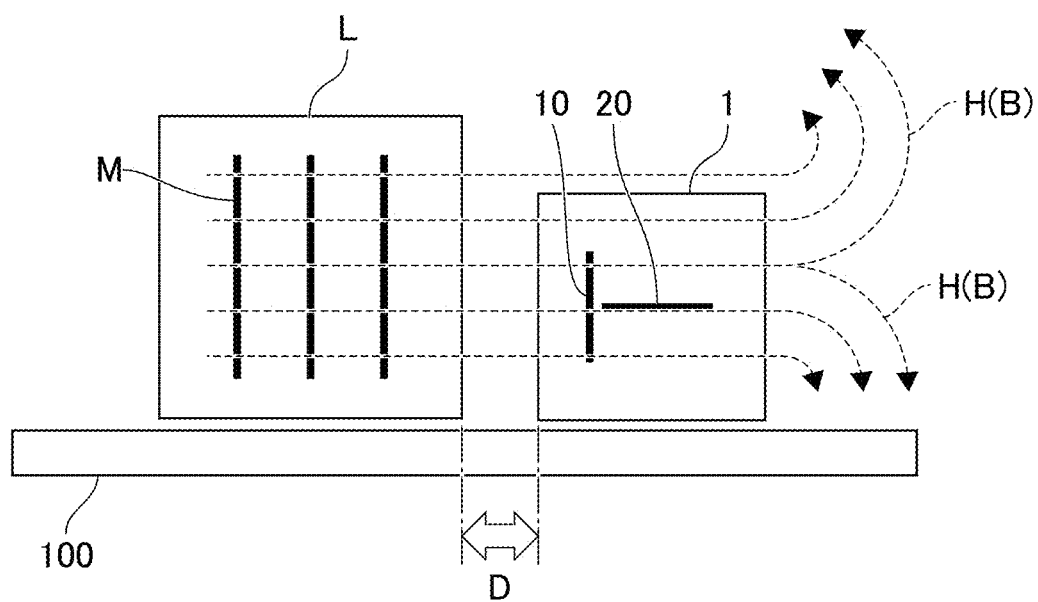
FIG. 7C is a cross-sectional view of a simulation model according to Modified Example 1, and is a cross-sectional view corresponding to the line shown in FIG. 2.
Figure 8B:
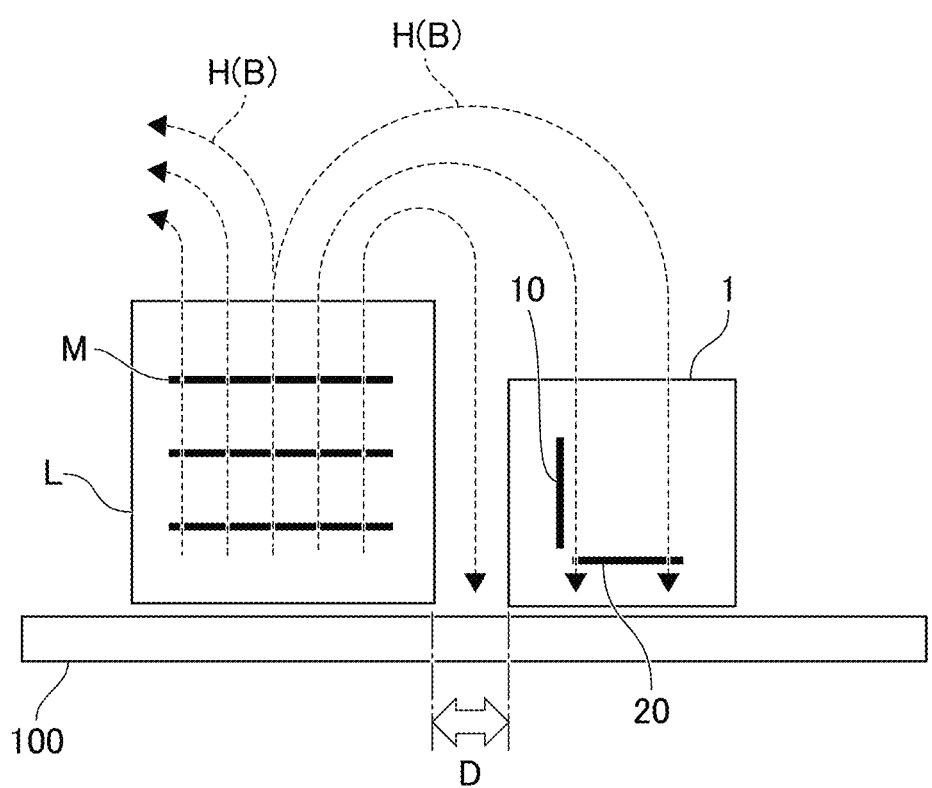
FIG. 8B is a cross-sectional view of a simulation model according to Modified Example 1, and is a cross-sectional view corresponding to the line III-III shown in FIG. 2.
Figure 8C:
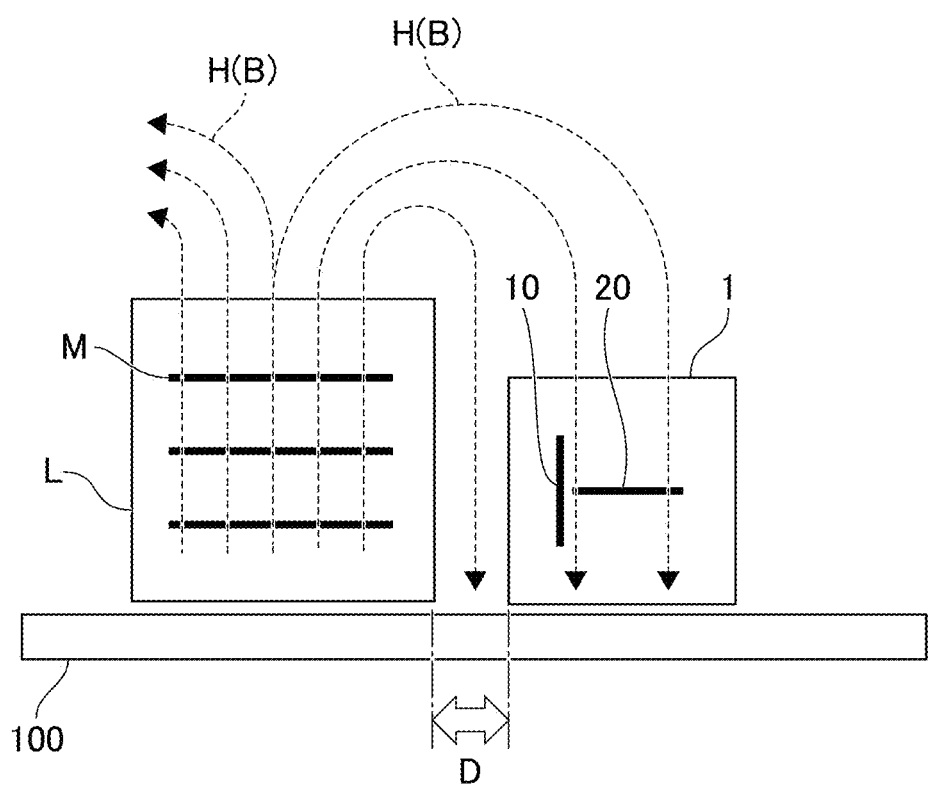
FIG. 8C is a cross-sectional view of a simulation model according to Modified Example 1, and is a cross-sectional view corresponding to the line III-III shown in FIG. 2.

Furthermore, as shown in FIG. 7B and FIG. 8B, and FIG. 7C and FIG. 8C, in the simulation model 1 of the multilayer capacitor, the arrangement position of the second internal electrode model 20 may be modified in the simulation model 1 of the multilayer capacitor shown in FIG. 7A and FIG. 8A. For example, as shown in FIG. 7B and FIG. 8B, the second internal electrode model 20 may be provided close to the other main surface of the two main surfaces, and thus provided at a position close to the lowermost layer of the actual internal electrode. Furthermore, as shown in FIG. 7C and FIG. 8C, the second internal electrode model 20 may be provided near the center between the two main surfaces, and thus provided at a position near the center between the uppermost layer and the lowermost layer of the actual internal electrode.

Thus, as shown in FIG. 7B and FIG. 7C, even if the multilayer inductor is a vertical winding type, the first internal electrode model 10 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Furthermore, as shown in FIGS. 8B and 8C, even if the multilayer inductor is a horizontal winding type, the second internal electrode model 20 intersects (i.e., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 7D:
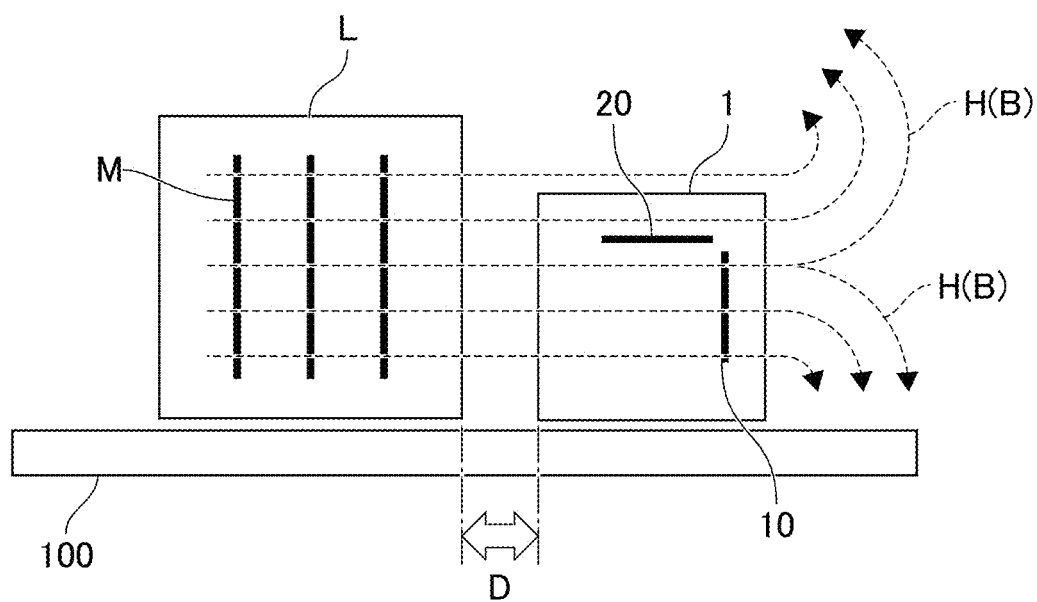
FIG. 7D is a cross-sectional view of a simulation model according to Modified Example 1, and is a cross-sectional view corresponding to the line shown in FIG. 2.
Figure 7E:
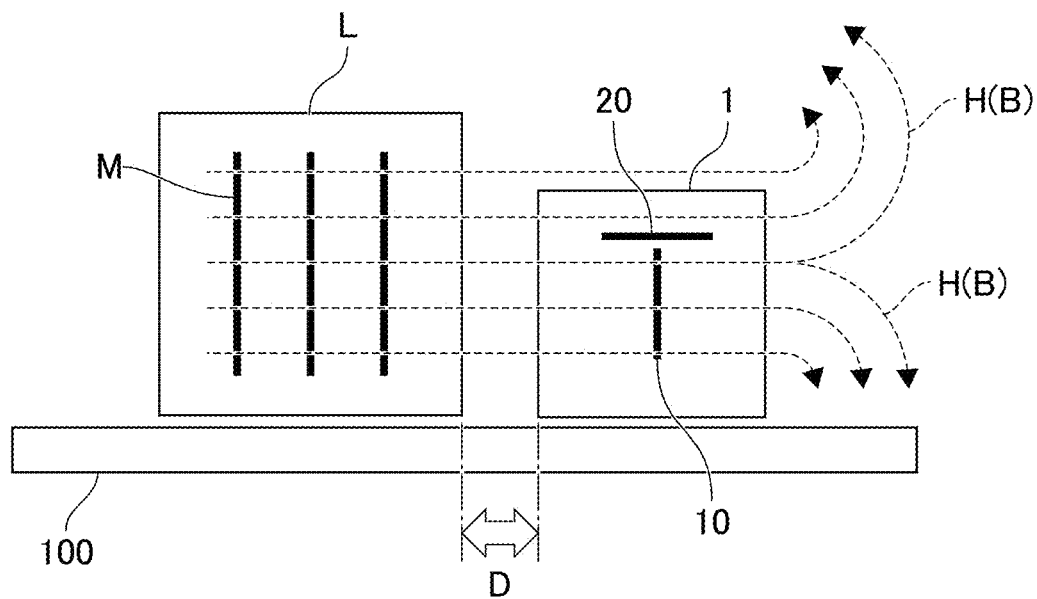
FIG. 7E is a cross-sectional view of a simulation model according to Modified Example 1, and is a cross-sectional view corresponding to the line III-III shown in FIG. 2.
Figure 8D:
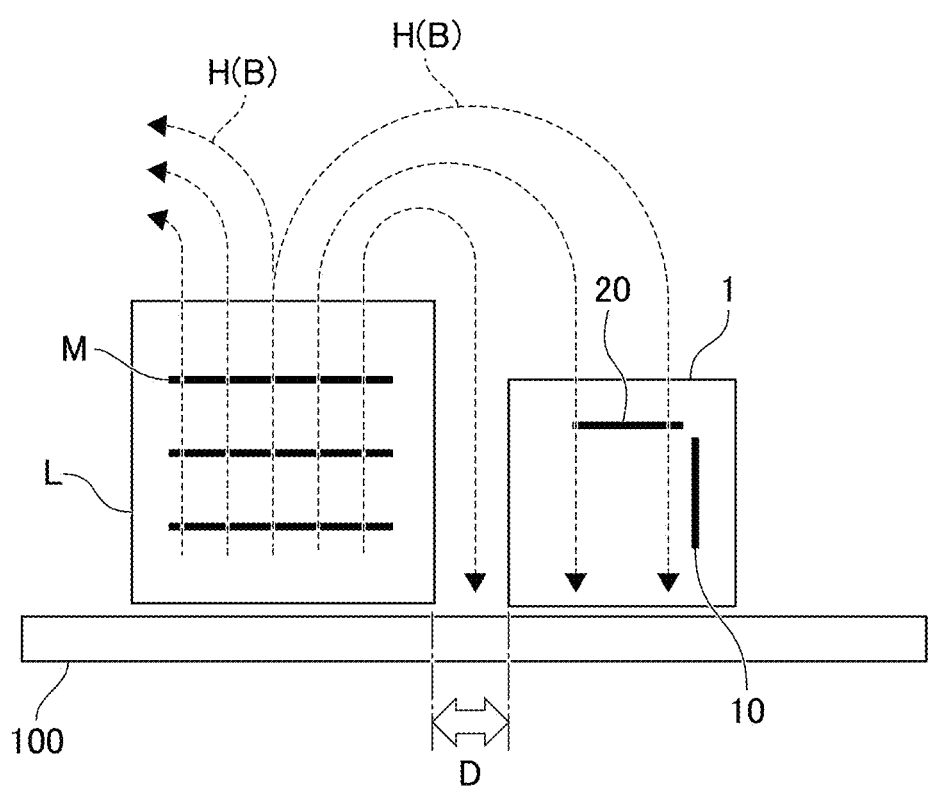
FIG. 8D is a cross-sectional view of a simulation model according to Modified Example 1, and is a cross-sectional view corresponding to the line III-III shown in FIG. 2.
Figure 8E:
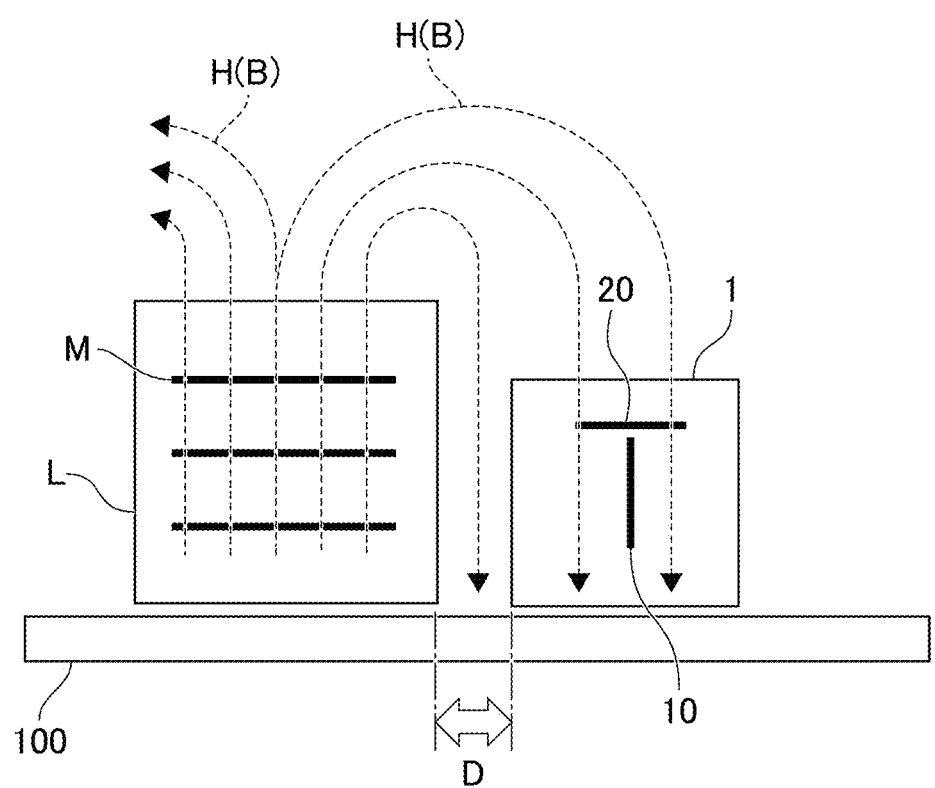
FIG. 8E is a cross-sectional view of a simulation model according to Modified Example 1, and is a cross-sectional view corresponding to the line III-III shown in FIG. 2.

Furthermore, as shown in FIG. 7D and FIG. 8D, and FIG. 7E and FIG. 8E, in the simulation model 1 of the multilayer capacitor, the arrangement position of the first internal electrode model 10 may be modified in the simulation model 1 of the multilayer capacitor shown in FIG. 7A and FIG. 8A. For example, as shown in FIGS. 7D and 8D, the first internal electrode model 10 may be provided close to the other side surface of the two side surfaces, and thus provided at a position of the edge portion close to the other side surface of the actual internal electrode. Furthermore, as shown in FIG. 7E and FIG. 8E, the first internal electrode model 10 may be provided near the center between the two side surfaces, and thus provided near the center between the edge portion close to the one side surface and the edge portion close to the other side surface of the actual internal electrode.

Thus, as shown in FIGS. 7D and 7E, even if the multilayer inductor is a vertical winding type, the first internal electrode model 10 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Furthermore, as shown in FIGS. 8D and 8E, even if the multilayer inductor is a horizontal winding type, the second internal electrode model 20 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 7F:
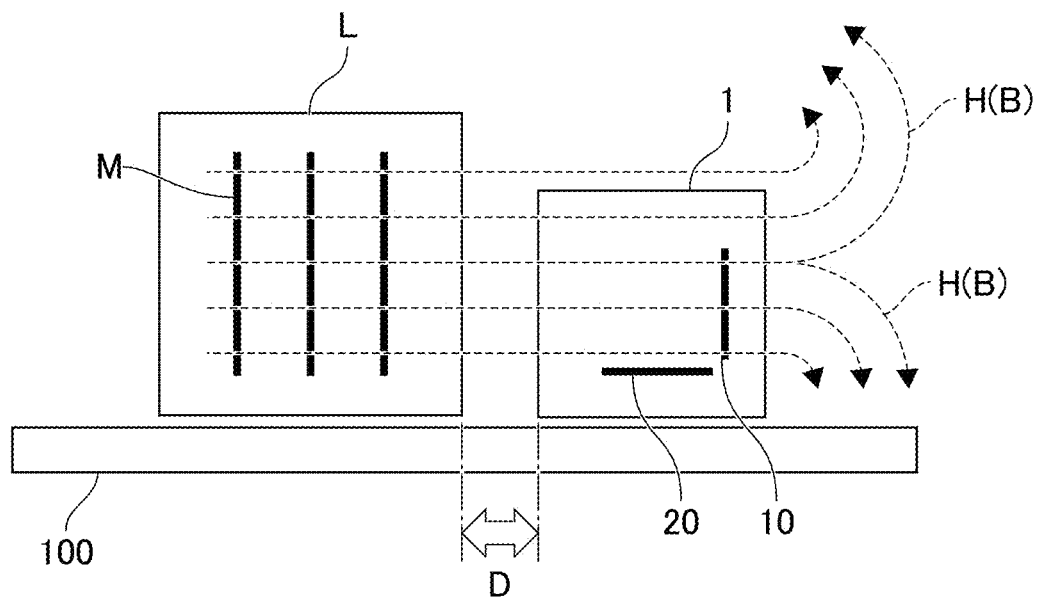
FIG. 7F is a cross-sectional view of a simulation model according to Modified Example 1, and is a cross-sectional view corresponding to the line III-III shown in FIG. 2.
Figure 7G:
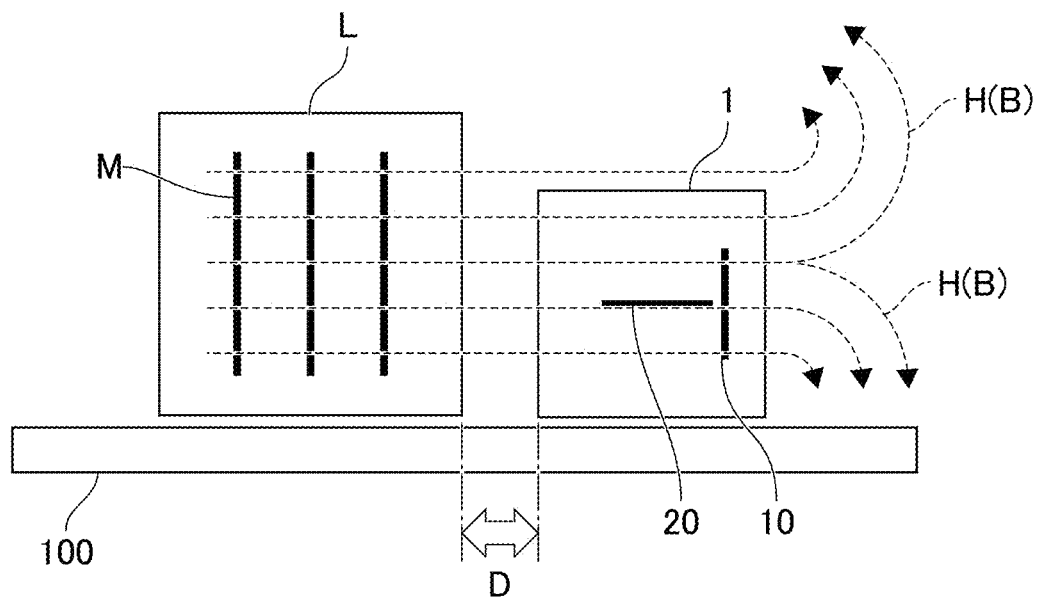
FIG. 7G is a cross-sectional view of a simulation model according to Modified Example 1, and is a cross-sectional view corresponding to the line III-III shown in FIG. 2.
Figure 7H:
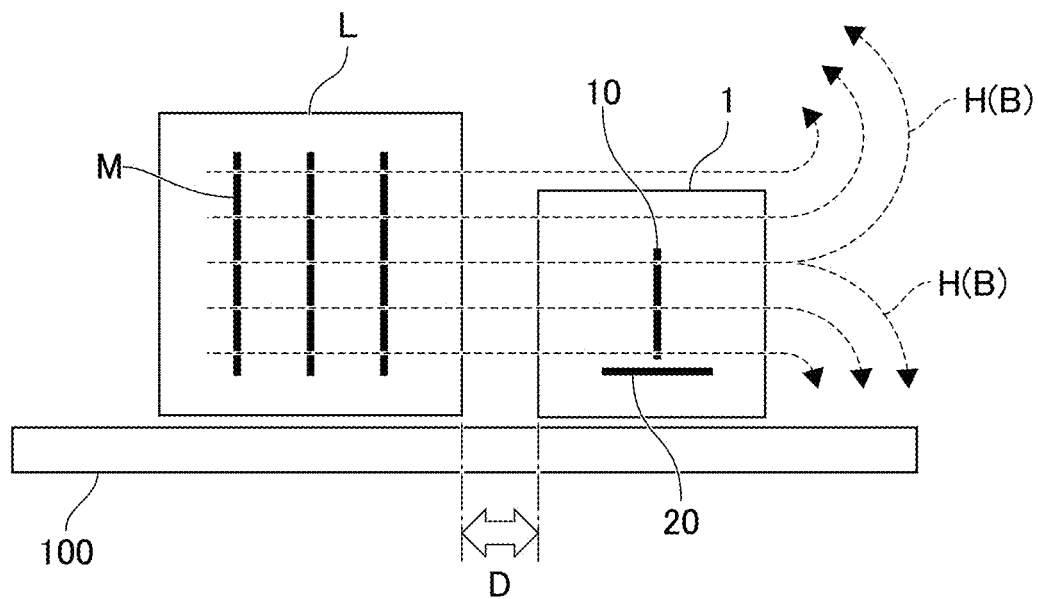
FIG. 7H is a cross-sectional view of a simulation model according to Modified Example 1, and is a cross-sectional view corresponding to the line III-III shown in FIG. 2.
Figure 7I:
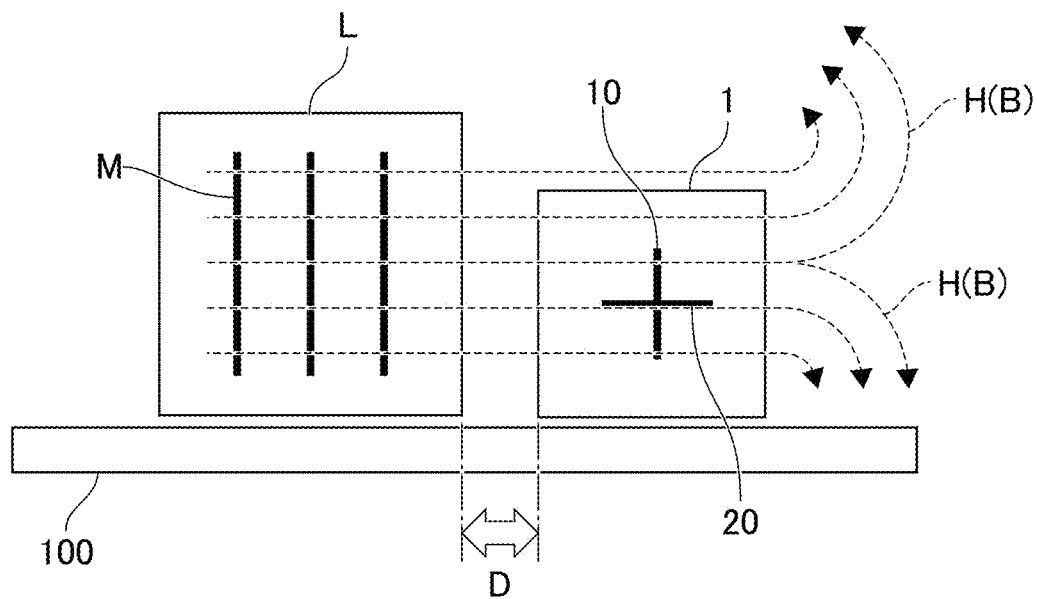
FIG. 7I is a cross-sectional view of a simulation model according to Modified Example 1, and is a cross-sectional view corresponding to the line III-III shown in FIG. 2.
Figure 8F:
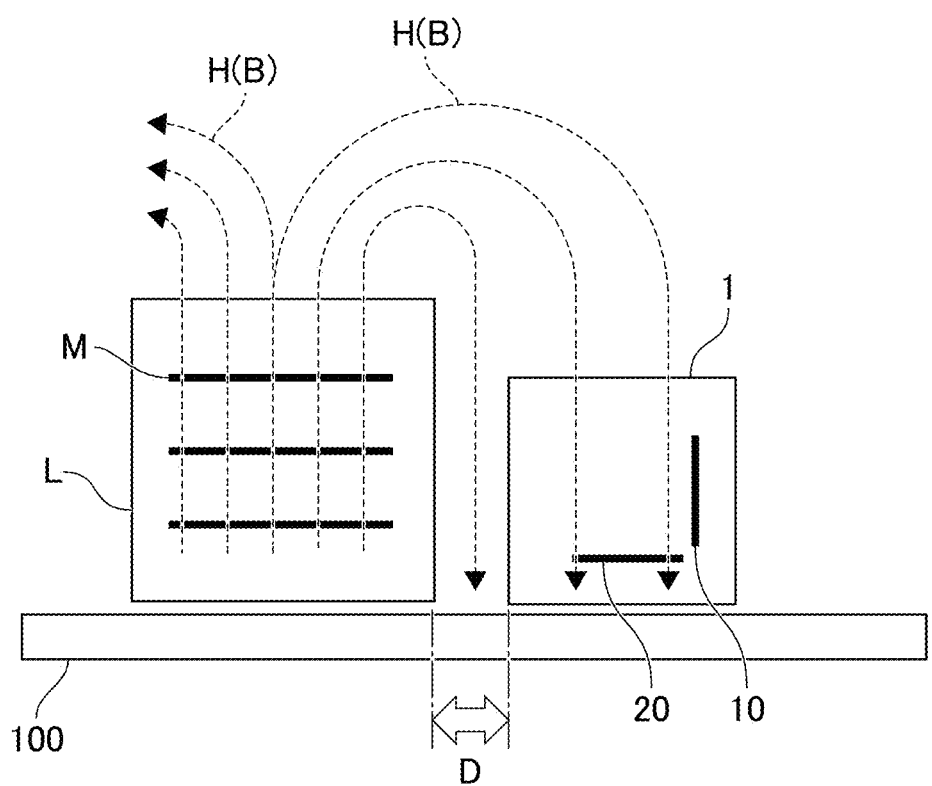
FIG. 8F is a cross-sectional view of a simulation model according to Modified Example 1, and is a cross-sectional view corresponding to the line III-III shown in FIG. 2.
Figure 8G:
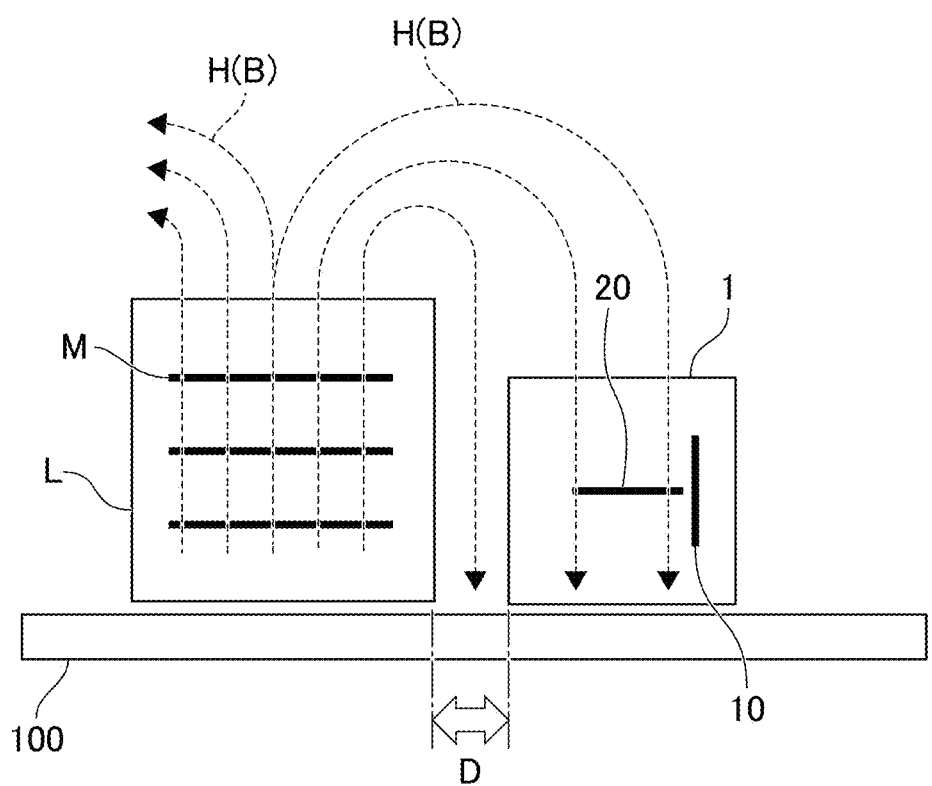
FIG. 8G is a cross-sectional view of a simulation model according to Modified Example 1, and is a cross-sectional view corresponding to the line III-III shown in FIG. 2.
Figure 8H:
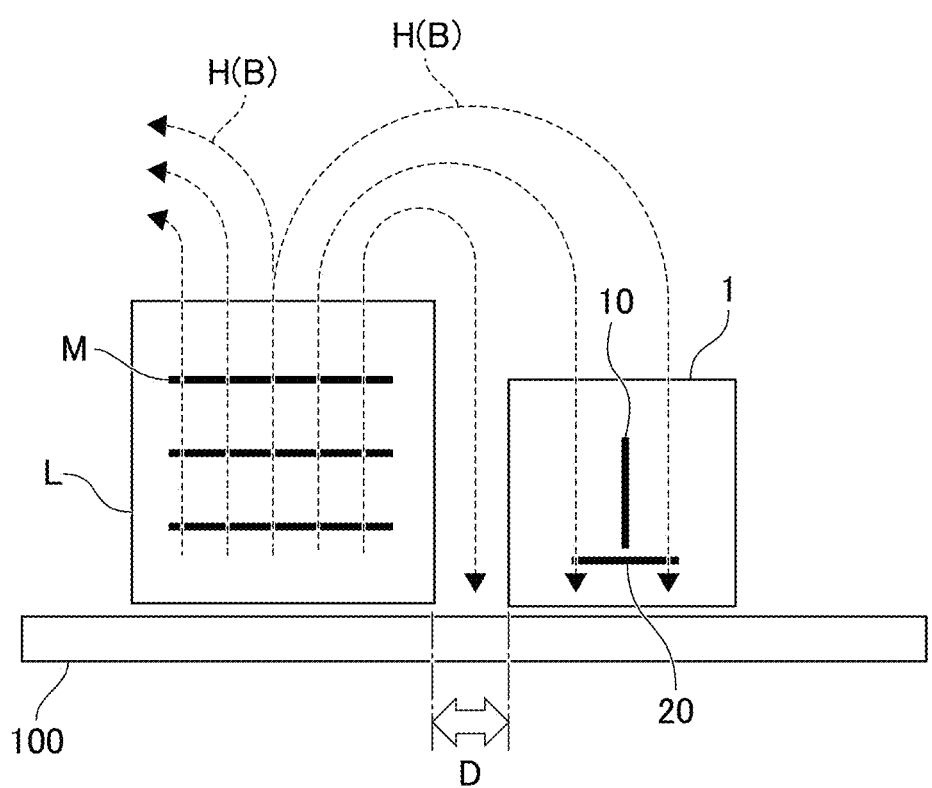
FIG. 8H is a cross-sectional view of a simulation model according to Modified Example 1, and is a cross-sectional view corresponding to the line III-III shown in FIG. 2.
Figure 8I:
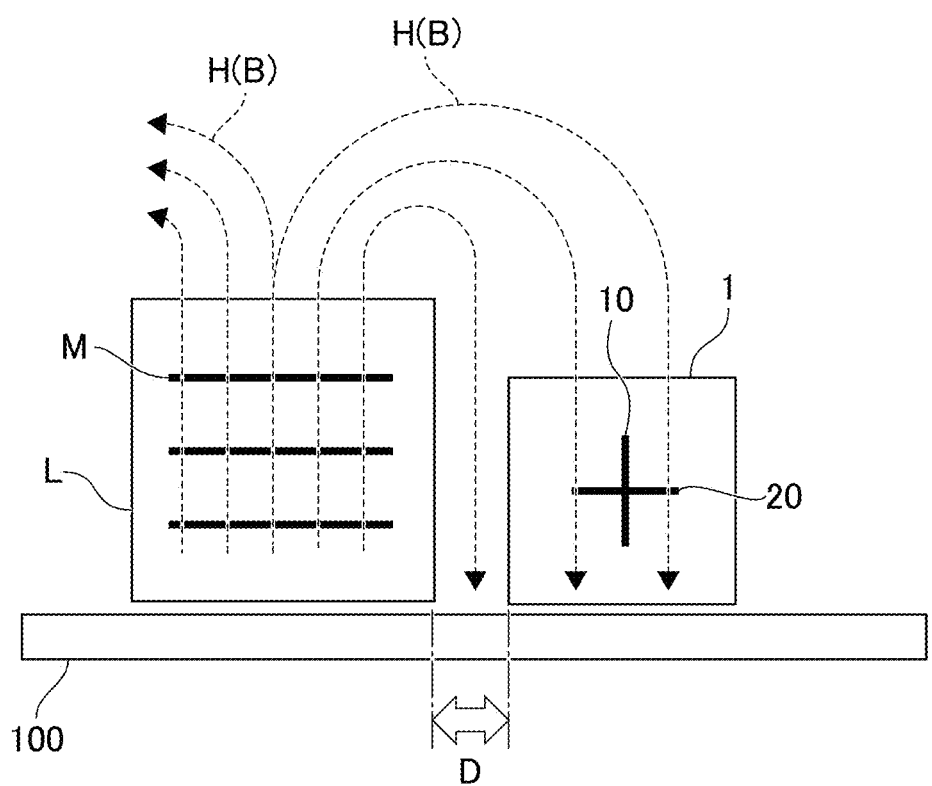
FIG. 8I is a cross-sectional view of a simulation model according to Modified Example 1, and is a cross-sectional view corresponding to the line III-III shown in FIG. 2.

Furthermore, as shown in FIG. 7F and FIG. 8F, FIG. 7G and FIG. 8G, FIG. 7H and FIG. 8H, and FIG. 7I and FIG. 8I, in the simulation model 1 of the multilayer capacitor, the arrangement position of the first internal electrode model 10 and the second internal electrode model 20 may be modified in the simulation model 1 of the multilayer capacitor shown in FIG. 7A and FIG. 8A. For example, as shown in FIG. 7F and FIG. 8F, the first internal electrode model 10 may be provided close to the other side surface of the two side surfaces, and thus provided at a position of the edge portion close to the other side surface of the actual internal electrode, and the second internal electrode model 20 may be provided close to the other main surface of the two main surfaces, and thus provided at a position close to the lowermost layer of the actual internal electrode. Furthermore, as shown in FIG. 7G and FIG. 8G, the first internal electrode model 10 may be provided close to the other side surface of the two side surfaces, and thus provided at a position of the edge portion close to the other side surface of the actual internal electrode, and the second internal electrode model 20 may be provided near the center of the two main surfaces, and thus provided at the position near the center between the uppermost layer and the lowermost layer of the actual internal electrode. Furthermore, as shown in FIG. 7H and FIG. 8H, the first internal electrode model 10 may be provided near the center between the two side surfaces, and thus provided at a position near the center between the edge portion close to the one side surface and the edge portion close to the other side surface of the actual internal electrode, and the second internal electrode model 20 may be provided close to the other main surface of the two main surfaces, and thus provided at a position close to the lowermost layer of the actual internal electrode. Furthermore, as shown in FIG. 7I and FIG. 8I, the first internal electrode model 10 may be provided near the center between the two side surfaces, and thus provided at a position near the center between the edge portion close to the one side surfaces and the edge portion close to the other side surface of the actual internal electrode, and the second internal electrode model 20 may be provided near the center of the two main surfaces, and thus provided at a position near the center between the uppermost layer and the lowermost layer of the actual internal electrode.

Thus, as shown in FIGS. 7F, 7G, 7H, and 7I, even if the multilayer inductor is a vertical winding type, the first internal electrode model 10 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Furthermore, as shown in FIGS. 8F, 8G, 8H, and 8I, even if the multilayer inductor is a horizontal winding type, the second internal electrode model 20 is provided to intersect (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

MODIFIED EXAMPLE 2

Figure 9A:
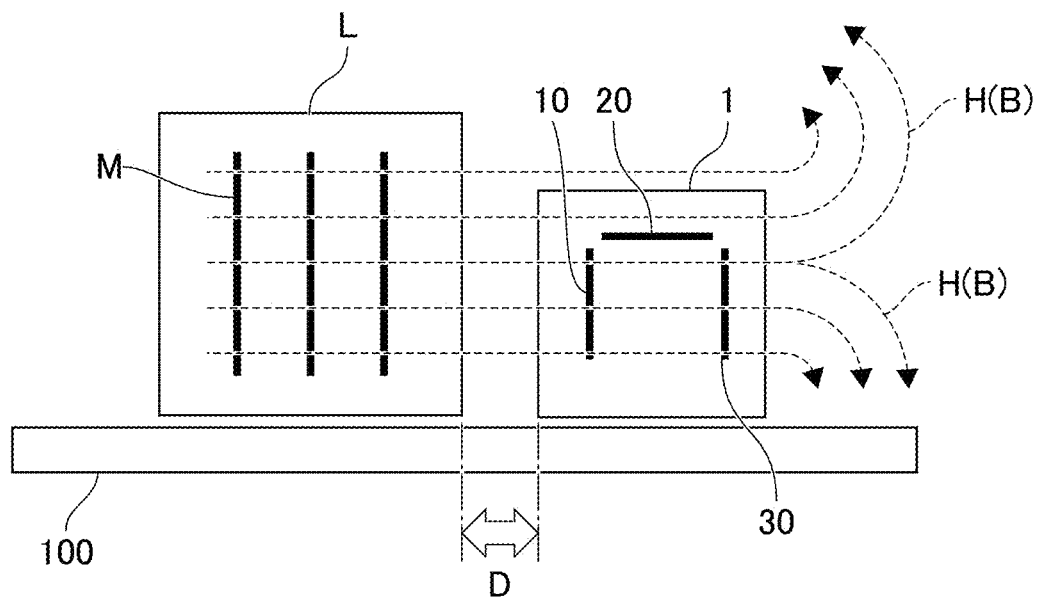
FIG. 9A is a cross-sectional view of a simulation model according to Modified Example 2 of a preferred embodiment of the present invention, and is a cross-sectional view corresponding to the line III-III shown in FIG. 2.
Figure 10A:
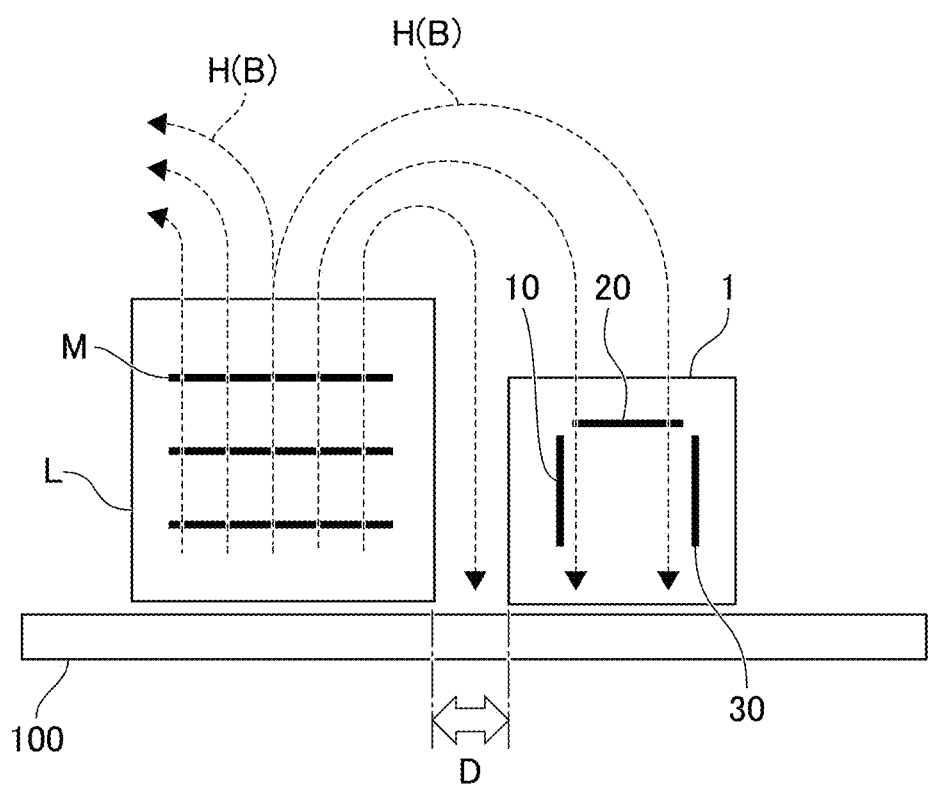
FIG. 10A is a cross-sectional view of a simulation model according to Modified Example 2, and is a cross-sectional view corresponding to the line shown in FIG. 2.

As shown in FIG. 9A and FIG. 10A, the simulation model 1 of the multilayer capacitor may include only three plate-shaped internal electrode models including the first internal electrode model 10, the second internal electrode model 20, and the third electrode model 30 in the simulation model 1 of the multilayer capacitor shown in FIG. 3. That is, the simulation model 1 of the multilayer capacitor may include only the first internal electrode model 10 and the third internal electrode model 30 facing the side surface of the multilayer capacitor, and the second internal electrode model 20 facing the main surface of the multilayer capacitor.

In this case, the capacitance C, the equivalent series resistance ESR, and the equivalent series inductance ESL obtained from the actually measured value of the impedance characteristics of the multilayer capacitor are set for the first internal electrode model 10, the second internal electrode model 20, and the third internal electrode model 30. The capacitance C, the equivalent series resistance ESR, and the equivalent series inductance ESL may be evenly provided or alternatively may be weighted and unevenly provided for the three internal electrode models.

Thus, as shown in FIG. 9A, even if the multilayer inductor is a vertical winding type, the first internal electrode model 10 and the third internal electrode model 30 intersect (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Furthermore, as shown in FIG. 10A, even if the multilayer inductor is a horizontal winding type, the second internal electrode model 20 intersects (e.g., perpendicular or substantially perpendicular to) the magnetic field H, i.e., the magnetic flux B, from the simulation model L of the multilayer inductor, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 9B:
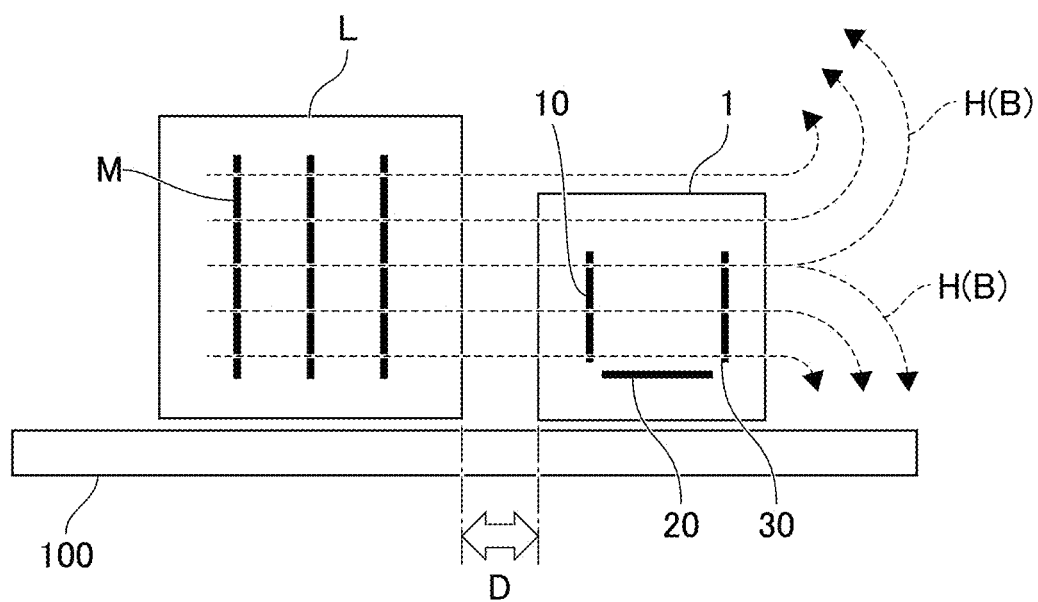
FIG. 9B is a cross-sectional view of a simulation model according to Modified Example 2, and is a cross-sectional view corresponding to the line III-III shown in FIG. 2.
Figure 9C:
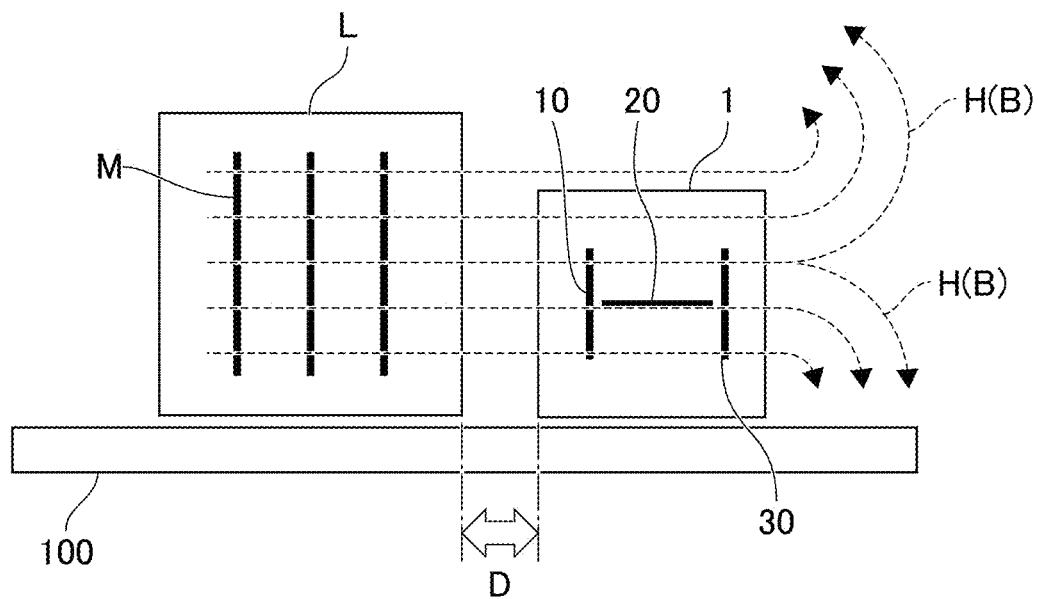
FIG. 9C is a cross-sectional view of a simulation model according to Modified Example 2, and is a cross-sectional view corresponding to the line shown in FIG. 2.
Figure 10B:
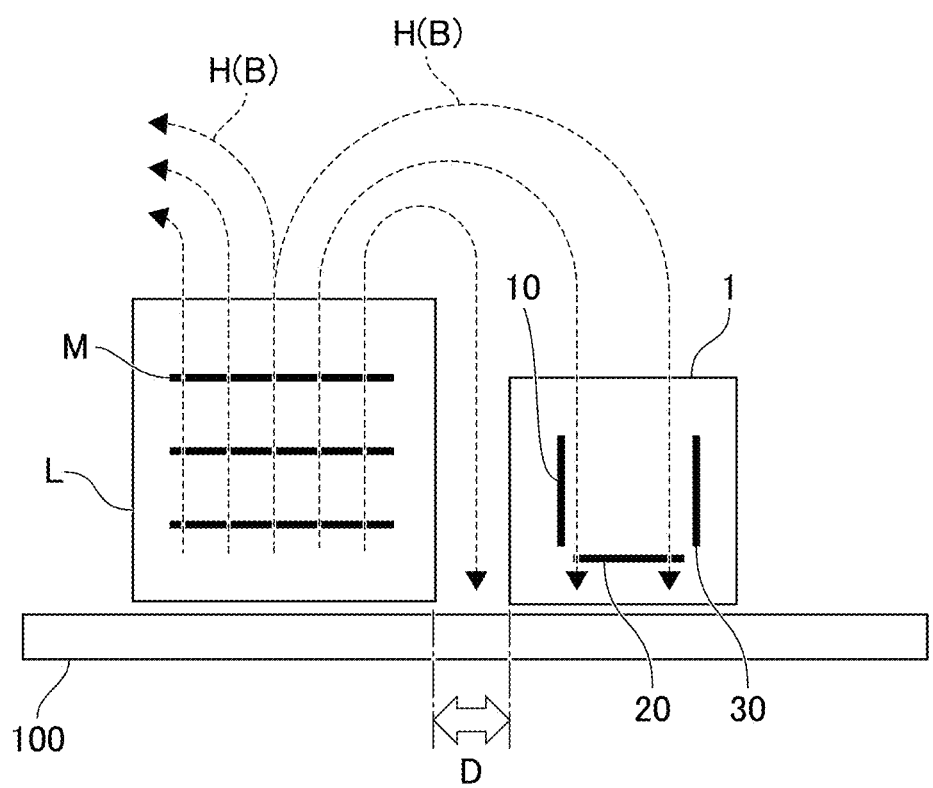
FIG. 10B is a cross-sectional view of a simulation model according to Modified Example 2, and is a cross-sectional view corresponding to the line shown in FIG. 2.
Figure 10C:
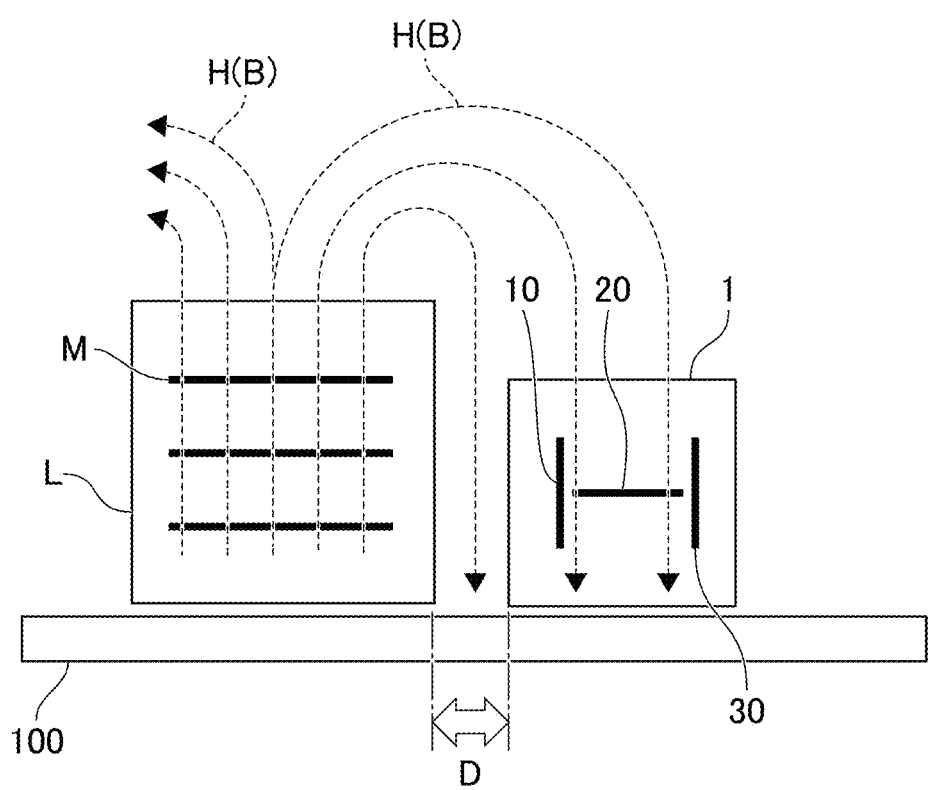
FIG. 10C is a cross-sectional view of a simulation model according to Modified Example 2, and is a cross-sectional view corresponding to the line shown in FIG. 2.

Furthermore, as shown in FIG. 9B and FIG. 10B, FIG. 9C and FIG. 10C, in the simulation model 1 of the multilayer capacitor, the arrangement position of the second internal electrode model 20 may be modified in the simulation model 1 of the multilayer capacitor shown in FIG. 9A and FIG. 10A. For example, as shown in FIGS. 9B and 10B, the second internal electrode model 20 may be provided close to the other main surface of the two main surfaces, and thus provided at a position close to the lowermost layer of the actual internal electrode. Furthermore, as shown in FIG. 9C and FIG. 10C, the second internal electrode model 20 may be provided near the center between the two main surfaces, and thus provided at a position near the center between the edge portion close to the one main surface and the edge portion close to the other main surface of the actual internal electrode.

Thus, as shown in FIGS. 9B and 9C, even if the multilayer inductor is a vertical winding type, the first internal electrode model 10 and the third internal electrode model 30 intersect (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Furthermore, as shown in FIGS. 10B and 10C, even if the multilayer inductor is a horizontal winding type, the second internal electrode model 20 intersects (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Although not shown, the simulation model 1 of the multilayer capacitor may include a single internal electrode model facing the side surface of the multilayer capacitor, and two internal electrode models facing the main surface of the multilayer capacitor.

MODIFIED EXAMPLE 3

Figure 11A:
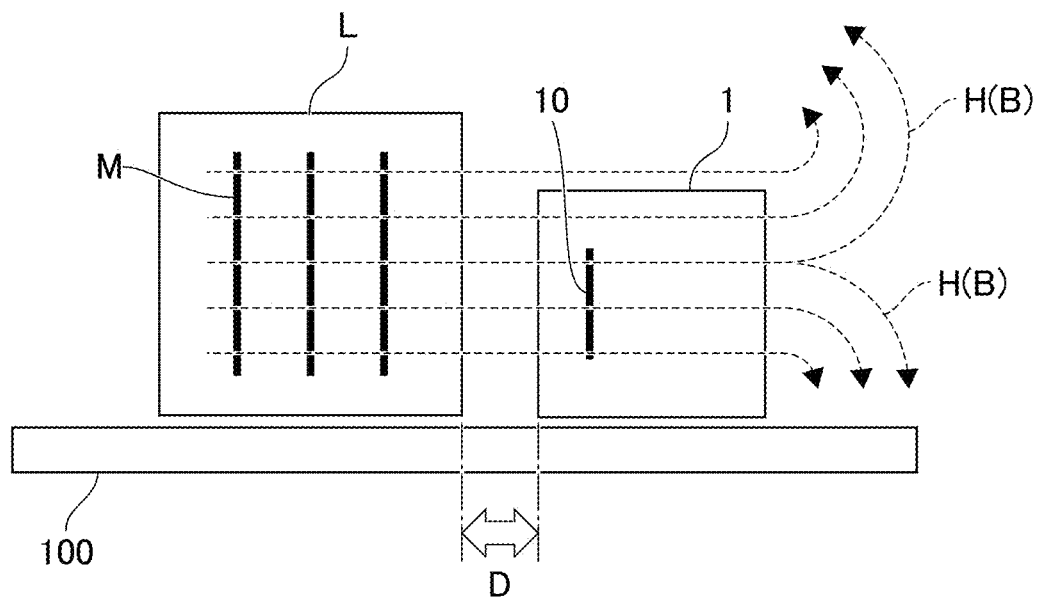
FIG. 11A is a cross-sectional view of a simulation model according to Modified Example 3 of a preferred embodiment of the present invention, and is a cross-sectional view corresponding to the line shown in FIG. 2.

As shown in FIG. 11A, the simulation model 1 of the multilayer capacitor may include only one plate-shaped first internal electrode model 10 in the simulation model 1 of the multilayer capacitor shown in FIG. 3. That is, the simulation model 1 of the multilayer capacitor may include only the first internal electrode model 10 facing the side surface of the multilayer capacitor.

In this case, the capacitance C, the equivalent series resistance ESR, and the equivalent series inductance ESL obtained from the actually measured value of the impedance characteristics of the multilayer capacitor are set for the first internal electrode model 10.

Thus, as shown in FIG. 11A, even if the multilayer inductor is a vertical winding type, the first internal electrode model 10 intersects (i.e., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 11B:
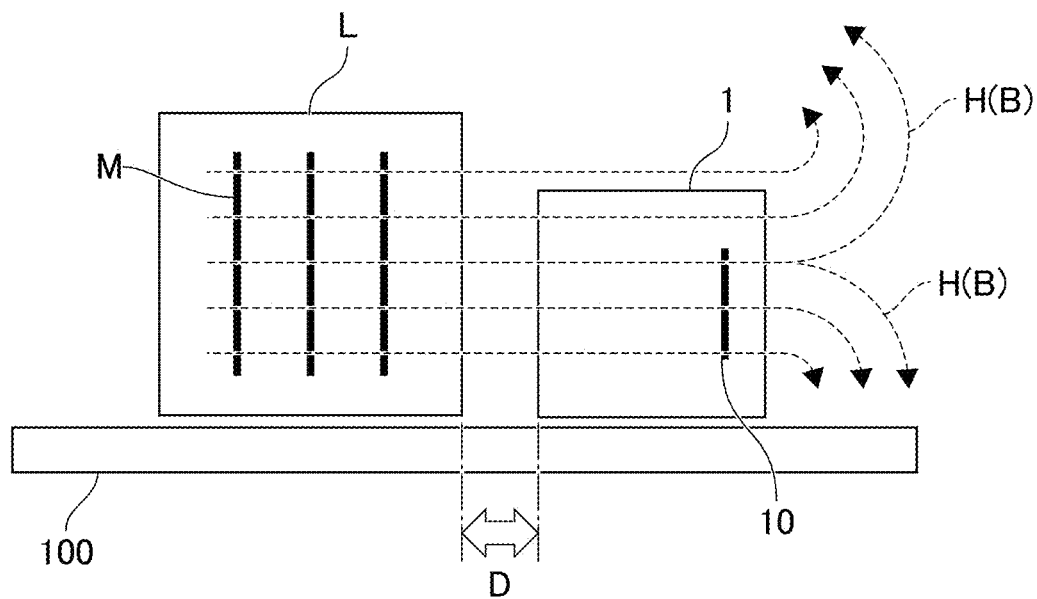
FIG. 11B is a cross-sectional view of a simulation model according to Modified Example 3, and is a cross-sectional view corresponding to the line shown in FIG. 2.
Figure 11C:
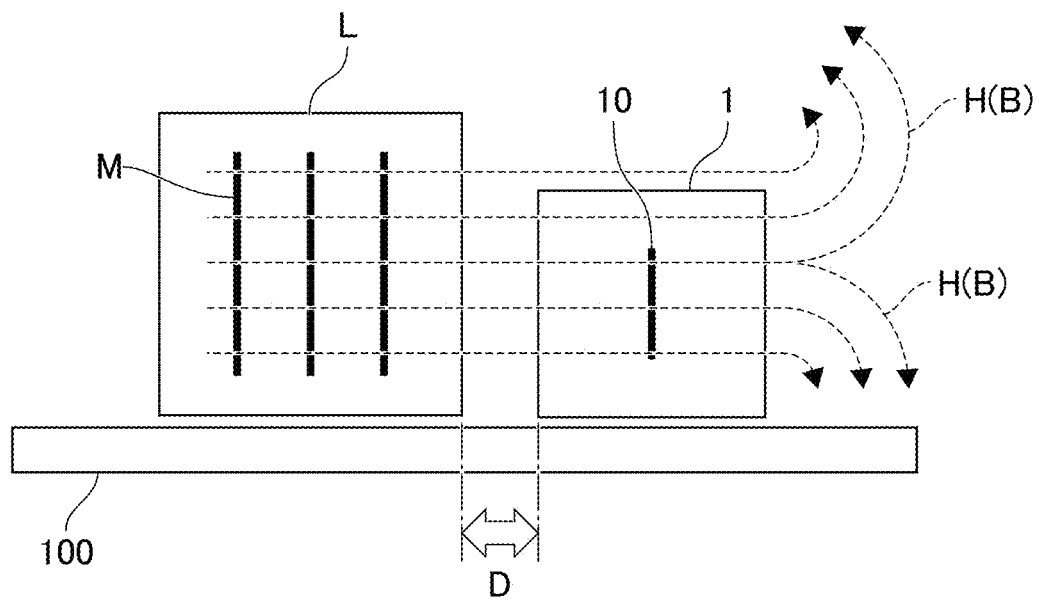
FIG. 11C is a cross-sectional view of a simulation model according to Modified Example 3, and is a cross-sectional view corresponding to the line shown in FIG. 2.

Furthermore, as shown in FIGS. 11B and 11C, in the simulation model 1 of the multilayer capacitor, the arrangement position of the first internal electrode model 10 may be modified in the simulation model 1 of the multilayer capacitor shown in FIG. 11A. For example, as shown in the drawing 11B, the first internal electrode model 10 may be provided close to the other side surface of the two side surfaces, and thus provided at a position of the edge position close to the other side surface of the actual internal electrode. Furthermore, as shown in FIG. 11C, the first internal electrode model 10 may be provided near the center between the two side surfaces, and thus provided at a position near the center between the edge portion close to the one side surface and the edge portion close to the other side surface of the actual internal electrode.

Thus, as shown in FIGS. 11B and 11C, even if the multilayer inductor is a vertical winding type, the first internal electrode model 10 is provided to intersect (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 12A:
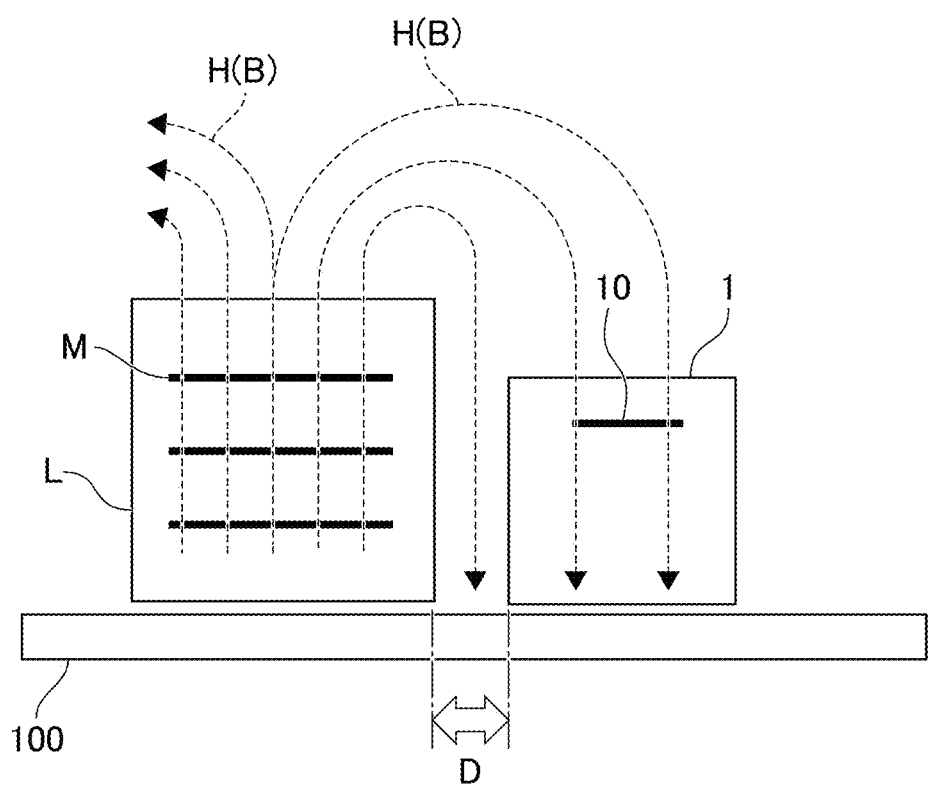
FIG. 12A is a cross-sectional view of a simulation model according to Modified Example 3, and is a cross-sectional view corresponding to the line shown in FIG. 2.

Furthermore, as shown in FIG. 12A, in the simulation model 1 of the multilayer capacitor, the arrangement position of the first internal electrode model 10 may be modified in the simulation model 1 of the multilayer capacitor shown in FIG. 11A. For example, as shown in FIG. 12A, the first internal electrode model 10 may be provided close to one main surface of the two main surfaces, and thus provided at a position close to the uppermost layer side of the actual internal electrode. That is, the simulation model 1 of the multilayer capacitor may include only the first internal electrode model 10 facing the main surface of the multilayer capacitor.

Thus, as shown in FIG. 12A, even if the multilayer inductor is a horizontal winding type, the first internal electrode model 10 intersects (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

Figure 12B:
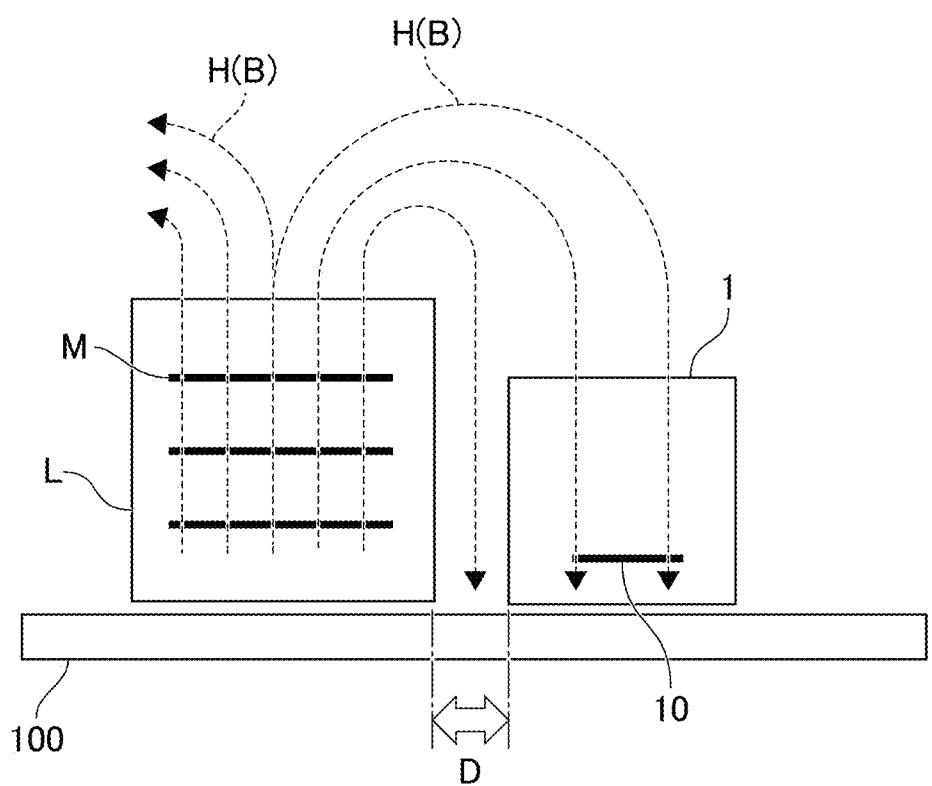
FIG. 12B is a cross-sectional view of a simulation model according to Modified Example 3, and is a cross-sectional view corresponding to the line III-III shown in FIG. 2.
Figure 12C:
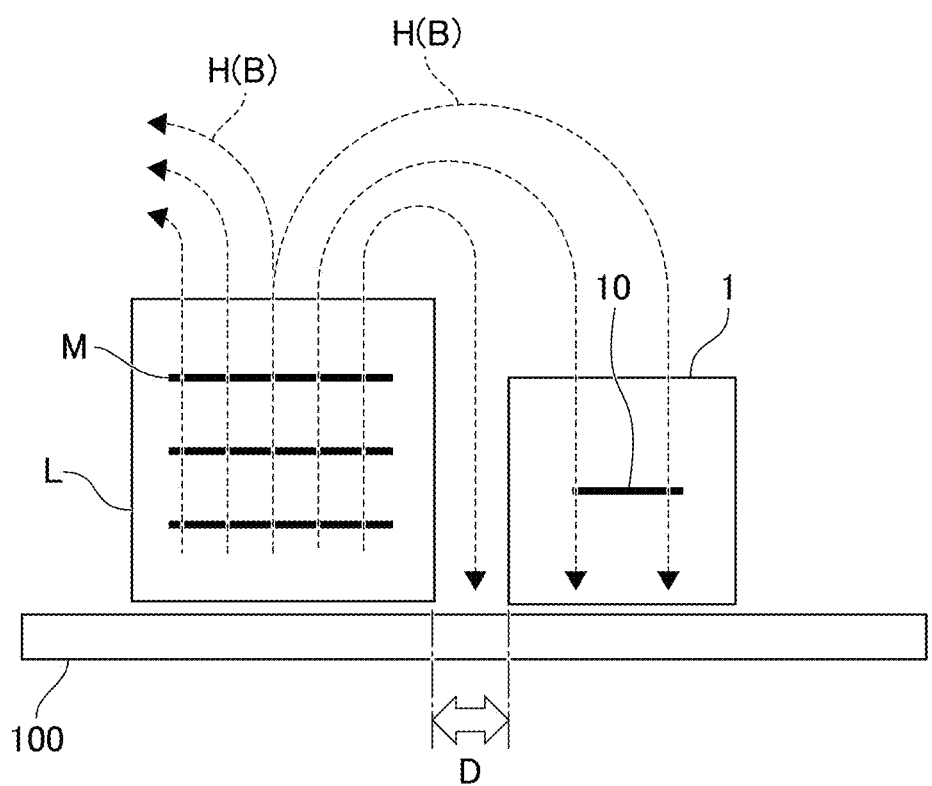
FIG. 12C is a cross-sectional view of a simulation model according to Modified Example 3, and is a cross-sectional view corresponding to the line III-III shown in FIG. 2.

Furthermore, as shown in FIGS. 12B and 12C, in the simulation model 1 of the multilayer capacitor, the arrangement position of the first internal electrode model 10 may be modified in the simulation model 1 of the multilayer capacitor shown in FIG. 12A. For example, as shown in FIG. 12B, the first internal electrode model 10 may be provided close to the other main surface of the two main surfaces, and thus provided at a position close to the lowermost layer of the actual internal electrode. Furthermore, as shown in FIG. 12C, the first internal electrode model 10 may be provided near the center between the two main surfaces, and thus provided at a position near the center between the uppermost layer and the lowermost layer of the actual internal electrode.

Thus, as shown in FIGS. 12B and 12C, even if the multilayer inductor is a horizontal winding type, the first internal electrode model 10 intersects (e.g., perpendicular or substantially perpendicular to) the magnetic field H, i.e., the magnetic flux B, from the simulation model L of the multilayer inductor, for example, and thus, it tends to be relatively susceptible to the magnetic field H, i.e., the magnetic flux B. Therefore, it is possible to shorten the simulation time while reducing or preventing a decrease in the simulation accuracy of crosstalk in the three-dimensional electromagnetic field simulation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A simulation method of a multilayer capacitor for three-dimensional electromagnetic simulation, the method comprising:
    providing a simulation model of a multilayer inductor between a first input/output port and a second input/output port, and providing a simulation model of the multilayer capacitor between a third input/output port and a fourth input/output port; and
    simulating a characteristic relating to crosstalk between the first input/output port and the fourth input/output port or between the third input/output port and the second input/output port by inputting a frequency sweep signal to the first input/output port or the third input/output port; wherein
    the simulation model of the multilayer capacitor includes a plate-shaped first internal electrode model between the third input/output port and the fourth input/output port, and a plate-shaped second internal electrode model between the third input/output port and the fourth input/output port;
    a capacitance, an equivalent series resistance, and an equivalent series inductance obtained from an actually measured value of an impedance characteristic of the multilayer capacitor are set for the first internal electrode model and the second internal electrode model;
    the first internal electrode model faces two side surfaces opposed in a width direction of the multilayer capacitor;
    the second internal electrode model faces two main surfaces opposed in a height direction intersecting the width direction of the multilayer capacitor; and
    the providing further includes providing the simulation model of the multilayer capacitor adjacent to the simulation model of the multilayer inductor, and the first internal electrode model or the second internal electrode model intersects a magnetic field from the simulation model of the multilayer inductor.

2. The simulation method of the multilayer capacitor according to claim 1, wherein
    the simulation model of the multilayer capacitor further includes a plate-shaped third internal electrode model between the third input/output port and the fourth input/output port, and a plate-shaped fourth internal electrode model between the third input/output port and the fourth input/output port;
    a capacitance, an equivalent series resistance, and an equivalent series inductance obtained from an actually measured value of an impedance characteristic of the multilayer capacitor are set for the third internal electrode model, and the fourth internal electrode model;
    the third internal electrode model faces the two side surfaces of the multilayer capacitor;
    the fourth internal electrode model faces the two main surfaces of the multilayer capacitor;
    the first internal electrode model is adjacent to or in a vicinity of one side surface among the two side surfaces, and the third internal electrode model is adjacent to or in a vicinity of another side surface among the two side surfaces;
    the second internal electrode model is adjacent to or in a vicinity of one main surface among the two main surfaces, and the fourth internal electrode model is adjacent to or in a vicinity of another main surface among the two main surfaces; and
    the providing further includes providing the simulation model of the multilayer capacitor adjacent to the simulation model of the multilayer inductor, and the first internal electrode model and the third internal electrode model, or the second internal electrode model and the fourth internal electrode model intersect a magnetic field from the simulation model of the multilayer inductor.

3. The simulation method of the multilayer capacitor according to claim 1, wherein
    the first internal electrode model includes first, second, and third portions connected in series; and
    the equivalent series inductance is set in the first portion, the capacitance is set in the second portion, and the equivalent series resistance is set in the third portion.

4. The simulation method of the multilayer capacitor according to claim 1, wherein
    the second internal electrode model includes first, second, and third portions connected in series; and
    the equivalent series inductance is set in the first portion, the capacitance is set in the second portion, and the equivalent series resistance is set in the third portion.

5. The simulation method of the multilayer capacitor according to claim 2, wherein
    the third internal electrode model includes first, second, and third portions connected in series; and
    the equivalent series inductance is set in the first portion, the capacitance is set in the second portion, and the equivalent series resistance is set in the third portion.

6. The simulation method of the multilayer capacitor according to claim 2, wherein
    the fourth internal electrode model includes first, second, and third portions connected in series; and
    the equivalent series inductance is set in the first portion, the capacitance is set in the second portion, and the equivalent series resistance is set in the third portion.

7. A simulation method of a multilayer capacitor for three-dimensional electromagnetic simulation, the method comprising:
    providing a simulation model of a multilayer inductor between a first input/output port and a second input/output port, and providing a simulation model of the multilayer capacitor between a third input/output port and a fourth input/output port; and
    simulating a characteristic relating to crosstalk between the first input/output port and the fourth input/output port or between the third input/output port and the second input/output port by inputting a frequency sweep signal to the first input/output port or the third input/output port; wherein the simulation model of the multilayer capacitor includes a plate-shaped first internal electrode model between the third input/output port and the fourth input/output port;

a capacitance, an equivalent series resistance, and an equivalent series inductance obtained from an actually measured value of an impedance characteristic of the multilayer capacitor are set for the first internal electrode model;

the first internal electrode model faces two side surfaces opposed in a width direction of the multilayer capacitor, or face two main surfaces opposed in a height direction intersecting the width direction of the multilayer capacitor; and the providing further includes providing the simulation model of the multilayer capacitor adjacent to the simulation model of the multilayer inductor, and the first internal electrode model intersects a magnetic field from the simulation model of the multilayer inductor.

8. The simulation method of the multilayer capacitor according to claim 7, wherein, where a stacking direction of the multilayer inductor corresponds to the width direction of the multilayer inductor, and an orientation of the magnetic field from the simulation model of the multilayer inductor corresponds to the width direction of the multilayer inductor, the first internal electrode model faces the two side surfaces of the multilayer capacitor.

9. The simulation method of the multilayer capacitor according to claim 8, wherein the providing further includes providing a mounting board for mounting the simulation model of the multilayer inductor and the simulation model of the multilayer capacitor; and the first internal electrode model intersects a main surface of the mounting board.

* * * * *